(12) United States Patent
Bhaduri et al.

(10) Patent No.: US 12,577,125 B2
(45) Date of Patent: Mar. 17, 2026

(54) METALS RECOVERY FROM SPENT SUPPORTED CATALYST

(71) Applicant: Chevron U.S.A. Inc., San Ramon, CA (US)

(72) Inventors: Rahul Shankar Bhaduri, Moraga, CA (US); Oleg A. Mironov, Kensington, CA (US); Alexander E. Kuperman, Moraga, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 554 days.

(21) Appl. No.: 17/744,018

(22) Filed: May 13, 2022

(65) Prior Publication Data

US 2023/0257280 A1 Aug. 17, 2023

Related U.S. Application Data

(60) Provisional application No. 63/310,034, filed on Feb. 14, 2022.

(51) Int. Cl.
| *C01G 39/02* | (2006.01) |
| *C01G 31/00* | (2006.01) |
(Continued)

(52) U.S. Cl.
CPC ........... *C01G 39/02* (2013.01); *C01G 31/006* (2013.01); *C01G 39/006* (2013.01); *C22B 7/009* (2013.01)

(58) Field of Classification Search
None
See application file for complete search history.

(56) References Cited

U.S. PATENT DOCUMENTS

| 4,087,510 A | 5/1978 | Steenken |
| 4,430,442 A * | 2/1984 | Sawyer ................... B01J 23/28 |
| | | 502/220 |

(Continued)

FOREIGN PATENT DOCUMENTS

| CN | 101435027 B * | 6/2010 |
| CN | 101918132 A | 12/2010 |

(Continued)

OTHER PUBLICATIONS

English translation of CN-109652652-A Description (Year: 2019).*

(Continued)

*Primary Examiner* — Anthony J Zimmer
*Assistant Examiner* — Zachary John Baum
(74) *Attorney, Agent, or Firm* — Mark Warzel

(57) ABSTRACT

An improved method for recovering metals from spent supported catalysts, including spent supported hydroprocessing catalysts. The method and associated processes comprising the method are useful to recover spent supported catalyst metals used in the petroleum and chemical processing industries. The method generally involves a combination of a pyrometallurgical and a hydrometallurgical method and includes forming a potassium carbonate calcine from the spent supported catalyst containing Group VIIIB/Group VIB/Group VB metal compound(s) combined with potassium carbonate, and extracting and recovering soluble Group VIB metal and soluble Group VB metal compounds from the potassium carbonate calcine.

40 Claims, 9 Drawing Sheets

ROASTING AND EXTRACTION OF METALS FROM SPENT
SUPPORTED CATALYST

(51) Int. Cl.
C01G 39/00 (2006.01)
C22B 7/00 (2006.01)

(56) References Cited

U.S. PATENT DOCUMENTS

| | | | |
|---|---|---|---|
| 4,495,157 A | 1/1985 | Sebenik | |
| 4,495,457 A | 1/1985 | Stahl | |
| 4,666,685 A | 5/1987 | Wiewiorowski | |
| 4,963,520 A | 10/1990 | Yoo | |
| 5,114,687 A | 5/1992 | Han | |
| 5,498,586 A | 3/1996 | Dai | |
| 5,702,500 A | 12/1997 | Llanos | |
| 5,968,348 A | 10/1999 | Sherwood, Jr. | |
| 5,980,730 A | 11/1999 | Morel | |
| 6,030,915 A | 2/2000 | de Boer | |
| 6,180,072 B1 | 1/2001 | Veal | |
| 6,589,908 B1 | 7/2003 | Ginestra | |
| 6,667,271 B2 | 12/2003 | Bartholdy | |
| 7,185,870 B2 | 3/2007 | Hong | |
| 7,449,103 B2 | 11/2008 | Lott | |
| 7,485,267 B2 | 2/2009 | Marcantonio | |
| 7,560,407 B2 | 7/2009 | Klein | |
| 7,618,530 B2 | 11/2009 | Satchell, Jr. | |
| 7,642,212 B2 | 1/2010 | Klein | |
| 7,658,895 B2 | 2/2010 | Bhaduri | |
| 7,736,607 B2 | 6/2010 | Marcantonio | |
| 7,737,068 B2 | 6/2010 | Powers | |
| 7,790,646 B2 | 9/2010 | Lopez | |
| 7,803,266 B2 | 9/2010 | Guillaume | |
| 7,837,960 B2 | 11/2010 | Bhaduri | |
| 7,846,404 B2 | 12/2010 | Bhaduri | |
| 8,024,232 B2 | 9/2011 | Mori | |
| 8,057,763 B2 | 11/2011 | Oogjen | |
| 8,236,169 B2 | 8/2012 | Nguyen | |
| 8,628,735 B2 | 1/2014 | Bhaduri | |
| 8,778,828 B2 | 7/2014 | Mironov | |
| 8,815,184 B2 | 8/2014 | Bhaduri | |
| 8,815,185 B1 | 8/2014 | Bhaduri | |
| 9,206,361 B2 | 12/2015 | Chabot | |
| 9,809,870 B2 | 11/2017 | Bhaduri | |
| 9,920,260 B2 | 3/2018 | Ojo | |
| 10,213,772 B2 | 2/2019 | Zhang | |
| 10,316,254 B2 * | 6/2019 | Molina | B01J 27/051 |
| 10,913,054 B2 | 2/2021 | Zhang | |
| 11,001,502 B2 | 5/2021 | Ojo | |
| 2004/0219082 A1 | 11/2004 | Matjie | |
| 2006/0135631 A1 | 6/2006 | Kopponen | |
| 2007/0025899 A1 | 2/2007 | Marcantonio | |
| 2009/0133536 A1 | 5/2009 | Bhaduri | |
| 2009/0159505 A1 | 6/2009 | Da Costa | |
| 2009/0163347 A1 | 6/2009 | Shah | |
| 2009/0163348 A1 | 6/2009 | Da Costa | |
| 2009/0310435 A1 | 12/2009 | Lott | |
| 2010/0163459 A1 | 7/2010 | Odueyungbo | |
| 2010/0163499 A1 | 7/2010 | Odueyungbo | |
| 2010/0167910 A1 | 7/2010 | Odueyungbo | |
| 2010/0167912 A1 | 7/2010 | Odueyungbo | |
| 2011/0014097 A1 | 1/2011 | Amelunxen | |
| 2011/0129397 A1 | 6/2011 | Shiokawa | |
| 2011/0226667 A1 | 9/2011 | Lott | |
| 2011/0306490 A1 | 12/2011 | Bhattacharyya | |
| 2012/0051988 A1 | 3/2012 | Marafi | |

FOREIGN PATENT DOCUMENTS

| | | | | |
|---|---|---|---|---|
| CN | 101500944 B | 4/2012 | | |
| CN | 101517104 B | 1/2013 | | |
| CN | 103119182 A | 5/2013 | | |
| CN | 109652652 A * | 4/2019 | | C22B 1/02 |
| CN | 110177777 A | 8/2019 | | |
| CN | 112746171 A * | 5/2021 | | C01F 7/04 |
| CN | 113564368 A * | 10/2021 | | C22B 23/026 |
| FR | 2668389 B1 | 7/1994 | | |
| JP | S59152218 A | 8/1984 | | |
| KR | 20070096139 A | 10/2007 | | |
| KR | 20080038193 A | 5/2008 | | |
| KR | 20100101615 A | 9/2010 | | |
| WO | 20060117101 A1 | 11/2006 | | |
| WO | 2007018805 A2 | 2/2007 | | |
| WO | 2009070778 A2 | 6/2009 | | |
| WO | 2010142397 A2 | 12/2010 | | |
| WO | 2012027532 A2 | 3/2012 | | |
| WO | WO-2021005526 A1 * | 1/2021 | | C22B 3/04 |
| WO | 2021150552 A1 | 7/2021 | | |

OTHER PUBLICATIONS

Furimsky, E. Selection of catalysts and reactors for hydroprocessing. Applied Catalysis A: General 171 (1998) 177-206. (Year: 1998).*

English translation of CN-101435027-B Description. (Year: 2010).*

English translation of CN-112746171-A Description. (Year: 2021).*

English translation of CN-113564368-A Description. (Year: 2021).*

Furimsky et al. "Deactivation of hydroprocessing catalysts." Catalysis Today 52.4 (1999): 381-495.

Kar et al. "Spent catalyst: secondary source for molybdenum recovery." Hydrometallurgy 72.1-2 (2004): 87-92.

Kar et al., "Recovery of molybdenum from spent hydro-refining catalysts by soda ash roasting", Eur. J. Mineral Proc. Envir. Pro., v5, No. 1, 1303-0868, 2005, pp. 100-104.

Marafi et al. "Options and processes for spent catalyst handling and utilization." Journal of hazardous materials 101.2 (2003): 123-132.

Marafi et al. "The recovery of valuable metals and recycling of alumina from a waste spent hydroprocessing catalyst: extraction with Na salts." WIT Trans Ecol Environ 180.2014 (2014): 15-27.

Morishita et al. "Calorimetric study of nickel molybdate: heat capacity, enthalpy, and Gibbs energy of formation." Journal of the American Ceramic Society 86.11 (2003): 1927-1932.

PCT International Search Report and Written Opinion mailed on Jun. 2, 21, issued in International Application No. PCT/US2021/014098, filed on Jan. 20, 2021, 18 pages.

PCT International Search Report and Written Opinion mailed on Sep. 28, 2020 issued in Application No. PCT/ IB2020/056420, filed on Jul. 8, 2020, 11 pages.

PCT International Search Report and Written Opinion mailed on Oct. 31, 2022, issued in International Application No. PCT/US2022/029214, filed on May 13, 2022, 9 pages.

* cited by examiner

**ROASTING AND EXTRACTION OF METALS FROM SPENT
SUPPORTED CATALYST**

AQUEOUS RECOVERY OF METALS FROM
SPENT SUPPORTED CATALYST

PROCESS FOR METALS RECOVERY FROM
SPENT SUPPORTED CATALYST

METALS RECOVERY FROM SPENT SUPPORTED CATALYST

CROSS-REFERENCE TO RELATED APPLICATIONS

This application claims the benefit of priority to U.S. Provisional Appl. Ser. No. 63/310,034, filed on Feb. 14, 2022, entitled "METALS RECOVERY FROM SPENT SUPPORTED CATALYST", the disclosure of which is herein incorporated by reference in its entirety.

FIELD OF THE INVENTION

The invention concerns a method for recovering metals from spent supported catalysts, including spent supported hydroprocessing catalysts.

BACKGROUND OF THE INVENTION

Catalysts have been widely used in the refining and chemical processing industries for many years. Hydroprocessing catalysts, including hydrotreating and hydrocracking catalysts, are now widely employed in facilities worldwide. Used or "spent" hydroprocessing catalysts that are no longer sufficiently active (or that require replacement for other reasons) typically contain metal components such as molybdenum, nickel, cobalt, vanadium, and the like. Many such catalysts include support materials and broadly termed "supported" catalysts. In contrast, catalysts lacking such supporting materials are typically classified as unsupported or bulk catalysts, or may simply not refer to the use of a support material.

With the advent of heavier crude feedstock, refiners are forced to use more catalysts than before for hydroprocessing to remove sulfur and contaminants from the feedstock. These catalytic processes generate significant quantities of spent catalyst serving a two-fold purpose viz. having lucrative metal values and foregoing landfill in accordance with environmental awareness thereof.

Various processes for recovering catalyst metals from spent catalysts are described in the literature. US Patent Publication No. 2007/0025899, for example, discloses a process to recover metals such as molybdenum, nickel, and vanadium from a spent catalyst with a plurality of steps and equipment to recover the molybdenum and nickel metal complexes. U.S. Pat. No. 6,180,072 discloses another complex process requiring oxidation steps and solvent extraction to recover metals from spent catalysts containing at least a metal sulphide. U.S. Pat. No. 7,846,404 discloses a process using pH adjustment and precipitation, for recovery of metals from ammoniacal pressure leach solution generated through oxidative pressure leaching of spent catalyst.

More recent efforts are disclosed in, e.g., WO 2021/005526A1, wherein the use of sodium carbonate is generally described in the recovery of metals from spent slurry (unsupported) catalysts. WO 2021/150552A1 further generally describes the use of potassium carbonate in the recovery of metals from spent slurry (unsupported) catalysts. Additional publications of interest are listed in Appendix A—Publications.

Despite the progress made in recovering catalyst metals from spent catalysts, and in particular from spent unsupported catalysts, a continuing need exists for an improved and simplified process to recover catalyst metals from spent catalysts, particularly from spent supported catalysts, including but not limited to molybdenum and vanadium.

SUMMARY OF THE INVENTION

The present invention is directed to a method for recovering catalyst metals from spent catalysts, particularly spent supported hydroprocessing catalysts. One of the goals of the invention is to provide improvements in spent supported catalyst metals recovery processes that provide lower capital and operating costs for metals recovery, preferably at increased metals recovery efficiency. The invention provides an innovative and cost-effective approach for supported catalyst metals recovery, while also providing improvements in overall supported catalyst metals recovery, that addresses important environmental sustainability needs in the oil and gas and metals recovery industries.

An improved method for recovering metals from spent supported catalysts is disclosed. The method and associated processes comprising the method are useful to recover supported catalyst metals used in the petroleum and chemical processing industries. The method generally involves both pyrometallurgical and hydrometallurgical techniques and methods. The pyrometallurgical method includes an oxidizing roast of a mixture of deoiled spent supported catalyst combined with potassium carbonate to form a calcine of the mixture. The calcine is then leached with water to yield soluble Group VB and VIB metal compounds and a residue comprising Groups VB, VIB and VIIIB metal compounds. The soluble fraction comprising Group VB and VIB metal compounds is combined with an ammonium salt to convert the Group VB and VIB metals under metathesis reaction conditions into their ammonium form. The Group VB metal is recovered through subsequent crystallization and the remaining Group VIB metal is recovered through acidification and precipitation of the Group VIB metal.

In one aspect, the pyrometallurgical method comprises heating a mixture of a deoiled spent supported catalyst comprising a Group VIB metal, a Group VIIIB metal, and a Group VB metal combined with potassium carbonate under oxidative conditions to reduce the levels of sulfur and carbon present in the catalyst to form a spent supported catalyst/potassium carbonate calcine comprising a water-soluble Group VIB metal compound, a water-soluble Group VB metal compound and a water-insoluble Group VIIIB metal compound; combining the spent supported catalyst/potassium carbonate calcine with water under slurry leach process conditions to form a spent supported catalyst/potassium carbonate calcine slurry and to leach the water-soluble Group VIB metal compound and the water-soluble Group VB metal compound from the spent supported catalyst/potassium carbonate calcine; separating and removing a filtrate and a solid residue from the spent supported catalyst/potassium carbonate calcine slurry, the filtrate comprising the water-soluble Group VIB metal compound and the water-soluble Group VB metal compound and the solid residue comprising the water-insoluble Group VIIIB metal compound; and recovering the water-soluble Group VIB metal compound and the water-soluble Group VB metal compound from the filtrate of the spent supported catalyst/potassium carbonate calcine slurry.

In a further aspect, the hydrometallurgical method comprises separately recovering Group VIB and Group VB metal compounds obtained from spent supported catalysts from a solution comprising the Group VIB and Group VB metal compounds by contacting the Group VIB/Group VB metal compound mixture with an ammonium salt under metathesis reaction conditions effective to convert the metal compounds to ammonium Group VB metal and ammonium Group VIB metal compounds; subjecting the mixture comprising the ammonium Group VB metal compound to conditions effective to crystallize the ammonium Group VB metal compound; filtering and washing the crystallized ammonium Group VB metal compound with a saturated ammonium Group VB metal compound wash solution at a pre-selected wash temperature and separately recovering the ammonium Group VB metal compound and an ammonium Group VIB metal compound filtrate; heating the ammonium Group VB metal compound under conditions effective to release ammonia and separately recovering the Group VB metal compound and ammonia; contacting the ammonium Group VIB metal compound filtrate with an inorganic acid under conditions effective to form a Group VIB metal oxide compound precipitate and an ammonium salt of the inorganic acid; and filtering and washing the Group VIB metal oxide compound precipitate with an ammonium Group VIB metal oxide compound wash solution at a pre-selected wash temperature and recovering the Group VIB metal oxide compound precipitate.

BRIEF DESCRIPTION OF THE DRAWINGS

The scope of the invention is not limited by any representative figures accompanying this disclosure and is to be understood to be defined by the claims of the application.

DETAILED DESCRIPTION

Figure 1:
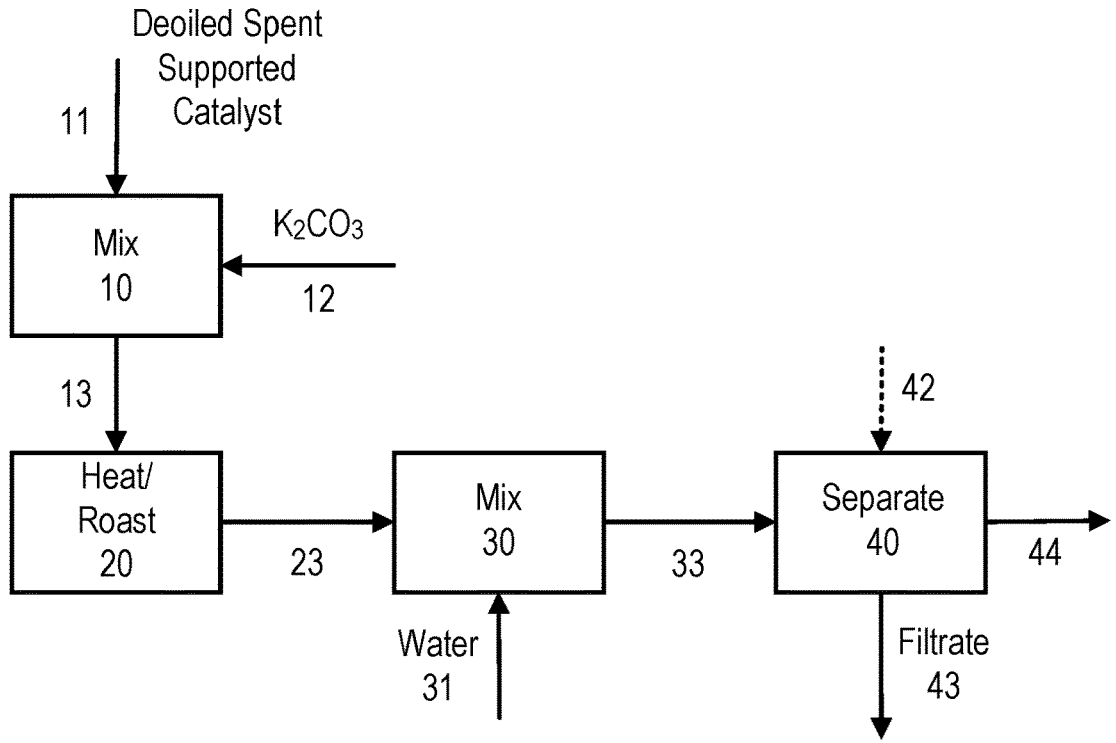
FIG. 1 is a general block diagram schematic illustration of an embodiment of a roasting and extraction method to recover metals from deoiled spent supported catalyst according to the invention.

Although illustrative embodiments of one or more aspects are provided herein, the disclosed processes may be implemented using any number of techniques. The disclosure is not limited to the illustrative or specific embodiments, drawings, and techniques illustrated herein, including any exemplary designs and embodiments illustrated and described herein, and may be modified within the scope of the appended claims along with their full scope of equivalents.

Unless otherwise indicated, the following terms, terminology, and definitions are applicable to this disclosure. If a term is used in this disclosure but is not specifically defined herein, the definition from the IUPAC Compendium of Chemical Terminology, 2nd ed (1997), may be applied, provided that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein is to be understood to apply.

"Supported catalyst" generally refers to catalyst compositions having a "support" material, including conventional catalyst forms containing a preformed, shaped catalyst support which is then loaded with metals via impregnation or deposition to form the supported catalyst. The term "support", particularly as used in the term "supported catalyst" and "catalyst support", refers to conventional materials that are typically a solid with a high surface area, to which catalyst materials are affixed. Support materials may be inert or participate in the catalytic reactions, and may be porous or non-porous. Typical catalyst supports include various kinds of carbon, alumina, silica, and silica-alumina, e.g., amorphous silica aluminates, zeolites, alumina-boria, silica-alumina-magnesia, silica-alumina-titania and materials obtained by adding other zeolites and other complex oxides thereto.

"Slurry catalyst" may be used interchangeably with "bulk catalyst" or "unsupported catalyst" or "self-supported catalyst," meaning that the catalyst composition is not of the conventional catalyst form with a preformed, shaped catalyst support which is then loaded with metals via impregnation or deposition catalyst. Such bulk catalyst may be formed through precipitation, or may have a binder incorporated into the catalyst composition. Slurry or bulk catalyst may also be formed from metal compounds and without any binder. In slurry form, such catalyst comprises dispersed particles in a liquid mixture such as hydrocarbon oil, i.e., a "slurry catalyst".

"Heavy oil" feed or feedstock refers to heavy and ultra-heavy crudes, including but not limited to resids, coals, bitumen, tar sands, oils obtained from the thermo-decomposition of waste products, polymers, biomasses, oils derived from coke and oil shales, etc. Heavy oil feedstock may be liquid, semi-solid, and/or solid. Examples of heavy oil feedstock include but are not limited to Canada Tar sands, vacuum resid from Brazilian Santos and Campos basins, Egyptian Gulf of Suez, Chad, Venezuelan Zulia, Malaysia, and Indonesia Sumatra. Other examples of heavy oil feedstock include residuum left over from refinery processes, including "bottom of the barrel" and "residuum" (or "resid"), atmospheric tower bottoms, which have a boiling point of at least 650° F. (343° C.), or vacuum tower bottoms, which have a boiling point of at least 975° F. (524° C.), or "resid pitch" and "vacuum residue" which have a boiling point of 975° F. (524° C.) or greater.

"Treatment," "treated," "upgrade," "upgrading" and "upgraded," when used in conjunction with a heavy oil feedstock, describes a heavy oil feedstock that is being or has been subjected to hydroprocessing, or a resulting material or crude product, having a reduction in the molecular weight of the heavy oil feedstock, a reduction in the boiling point range of the heavy oil feedstock, a reduction in the concentration of asphaltenes, a reduction in the concentration of hydrocarbon free radicals, and/or a reduction in the quantity of impurities, such as sulfur, nitrogen, oxygen, halides, and metals.

The upgrade or treatment of heavy oil feeds is generally referred herein as "hydroprocessing" (hydrocracking, or hydroconversion). Hydroprocessing is meant as any process that is carried out in the presence of hydrogen, including, but not limited to, hydroconversion, hydrocracking, hydrogenation, hydrotreating, hydrodesulfurization, hydrodenitrogenation, hydrodemetallation, hydrodearomatization, hydroisomerization, hydrodewaxing and hydrocracking including selective hydrocracking.

The term "Hydrogen" or "hydrogen" refers to hydrogen itself, and/or a compound or compounds that provide a source of hydrogen.

"Hydrocarbonaceous", "hydrocarbon" and similar terms refer to a compound containing only carbon and hydrogen atoms. Other identifiers may be used to indicate the presence of particular groups, if any, in the hydrocarbon (e.g., halogenated hydrocarbon indicates the presence of one or more halogen atoms replacing an equivalent number of hydrogen atoms in the hydrocarbon).

"Spent supported catalyst" refers to a supported catalyst that has been used in a hydroprocessing operation and whose activity has thereby been diminished. In general, a catalyst may be termed "spent" if a reaction rate constant of the catalyst is below a certain specified value relative to a fresh catalyst at a specified temperature. In some circumstances, a catalyst may be "spent" if the reaction rate constant, relative to fresh unused catalyst, is 80% or less, or perhaps 50% or less in another embodiment. In one embodiment, the metal components of the spent catalyst comprise at least one of Groups VB, VIB, and VIIIB metals (of the Periodic Table), e.g., vanadium (V), molybdenum (Mo), tungsten (W), Iron (Fe), nickel (Ni), and cobalt (Co). The most commonly encountered metal to be recovered is Mo. While not necessarily limited thereto, the spent supported catalyst typically contains sulfides of Mo, Ni, and V.

"Deoiled spent supported catalyst" generally refers to a "spent supported catalyst", as described hereinabove, that has been subjected to a deoiling process. In general, deoiled spent supported catalyst contains some residual oil hydrocarbons, such as unconverted oil and/or hydroprocessing products, as well as other chemical compounds and materials. For example, deoiled spent supported catalyst may typically contain 15 wt. % or more residual hydrocarbons, or, if processed to remove such hydrocarbons, a reduced amount, such as 1 wt. % or less, or 1000 ppm or less. Content specifications for such additional components are specified herein, as appropriate, whether in general or specific terms.

"Metal" refers to metals in their elemental, compound, or ionic form. "Metal precursor" refers to the metal compound feed in a method or to a process. The term "metal", "metal precursor", or "metal compound" in the singular form is not limited to a single metal, metal precursor, or metal compound, e.g., a Group VIB, Group VIII, or Group V metal, but also includes the plural references for mixtures of metals. The terms "soluble" and "insoluble" in reference to a Group VIB, Group VIII, or Group V metal or metal compound means the metal component is in a protic liquid form unless otherwise stated, or that the metal or metal compound is soluble or insoluble in a specified step or solvent.

"Group IIB" or "Group IIB metal" refers to zinc (Zn), cadmium (Cd), mercury (Hg), and combinations thereof in any of elemental, compound, or ionic form.

"Group IVA" or" "Group IVA metal" refers to germanium (Ge), tin (Sn) or lead (Pb), and combinations thereof in any of elemental, compound, or ionic form.

"Group VB metal" refers to vanadium (V), niobium (Nb), tantalum (Ta), and combinations thereof in their elemental, compound, or ionic form.

"Group VIB" or "Group VIB metal" refers to chromium (Cr), molybdenum (Mo), tungsten (W), and combinations thereof in any of elemental, compound, or ionic form.

"Group VIIIB" or "Group VIIIB metal" refers to iron (Fe), cobalt (Co), nickel (Ni), ruthenium (Ru), rhenium (Rh), rhodium (Rh), palladium (Pd), osmium (Os), iridium (Ir), platinum (Pt), and combinations thereof in any of elemental, compound, or ionic form.

The reference to Mo or "molybdenum" is by way of exemplification only as a Group VIB metal, and is not meant to exclude other Group VIB metals/compounds and mixtures of Group VIB metals/compounds. Similarly, the reference to Ni or "nickel" is by way of exemplification only and is not meant to exclude other Group VIIIB non-noble metal components; Group VIIIB metals; Group VIB metals; Group IVB metals; Group IIB metals and mixtures thereof that can be used in hydroprocessing catalysts. Similarly, the reference to V or "vanadium" is by way of exemplification only for any Group VB metal component that may be present in spent supported catalysts, and is not intended to exclude other Group VB metals/compounds and mixtures that may be present in the spent supported catalyst used for metal recovery.

The description of a combination of metal compounds represented by the use of the term "Group VIIIB/Group VIB/Group VB" to describe metal compounds that may be present is intended to mean that Group VIIIB, Group VIB or Group VB metal compounds may be present, as well as any combination thereof. For example, if the spent catalyst comprises metal compounds of Mo, V, Ni, and Fe, as oxygen and/or sulfur-containing compounds, the term "Group VIIIB/Group VIB/Group VB" should be understood to include single and mixed metal compounds, i.e., metal compounds comprising Group VIIIB, Group VIB, Group VB metals, or a combination thereof. Representative compounds include, e.g., $MoS_2$, $V_2S_3$, NiS, FeS, $MoO_3$, $V_2O_3$, NiO, $V_2O_5$, $Fe_2O_3$, $NiMoO_4$, $FeVO_4$, $Ni_3(VO_4)_2$ and the like. Similarly, the terms "Group VB/Group VIB" metal(s) and metal oxide(s) refer to metal or metal oxide compounds comprising Group VB, Group VIB metals, or a combination thereof.

"Molecular sieve" refers to a material having uniform pores of molecular dimensions within a framework structure, such that only certain molecules, depending on the type of molecular sieve, have access to the pore structure of the molecular sieve, while other molecules are excluded, e.g., due to molecular size and/or reactivity. Zeolites, crystalline aluminophosphates and crystalline silicoaluminophosphates are representative examples of molecular sieves.

In this disclosure, while compositions and methods or processes are often described in terms of "comprising" various components or steps, the compositions and methods may also "consist essentially of" or "consist of" the various components or steps, unless stated otherwise.

The terms "a," "an," and "the" are intended to include plural alternatives, e.g., at least one. For instance, the disclosure of "a transition metal" or "an alkali metal" is meant to encompass one, or mixtures or combinations of more than one, transition metal or alkali metal, unless otherwise specified.

All numerical values within the detailed description and the claims herein are modified by "about" or "approximately" the indicated value, and consider experimental error and variations that would be expected by a person having ordinary skill in the art.

The present invention is a method for recovering metals from a deoiled spent catalyst, wherein the spent catalyst comprises a Group VIB metal, a Group VIIIB metal, and a Group VB metal. In one aspect, the method comprises:

combining a deoiled spent supported catalyst comprising Group VIIIB, Group VIB, and Group VB metals with potassium carbonate to form a deoiled spent catalyst/ potassium carbonate mixture;

heating the deoiled spent supported catalyst/potassium carbonate mixture under oxidative conditions to reduce the levels of sulfur and carbon and to form a spent supported catalyst/potassium carbonate calcine comprising a water-soluble Group VIB metal compound, a water-soluble Group VB metal compound and a water-insoluble Group VIIIB metal compound;

combining the spent supported catalyst/potassium carbonate calcine with water under slurry leach process conditions to form a spent supported catalyst/potassium carbonate calcine slurry and to leach the water-soluble Group VIB metal compound and the water-soluble Group VB metal compound from the spent supported catalyst/potassium carbonate calcine;

separating and removing a filtrate and a solid residue from the spent supported catalyst/potassium carbonate calcine slurry, the filtrate comprising the water-soluble Group VIB metal compound and the water-soluble Group VB metal compound and the solid residue comprising the water-insoluble Group VIIIB metal compound; and recovering the water-soluble Group VIB metal compound and the water-soluble Group VB metal compound from the filtrate resulting from the spent supported catalyst/potassium carbonate calcine slurry.

The method provides for an improved recovery of spent supported catalyst metals and a cost-effective simplified approach to the recovery of metals from spent supported catalysts. The method utilizes a leaching extraction stage, i.e., a water leach extraction of a spent supported catalyst/potassium carbonate calcine formed from heating the deoiled spent supported catalyst/potassium carbonate mixture under oxidative conditions. The method utilizes one leaching extraction stage comprising a water leach extraction of the potassium carbonate calcine formed from the calcined spent supported catalyst combined with potassium carbonate. The method does not require the use of additional extraction stages (within the method), such as the addition of other solvents (e.g., tertiary amines for extraction of soluble metals) or additional treatment of organic compounds (e.g., with activated carbon, bentonite) in combination with the use of potassium carbonate.

The spent supported catalyst generally originates from a supported Group VIB metal sulfide catalyst optionally containing a metal selected from a Group VB metal such as V, Nb; a Group VIIIB metal such as Ni, Co; a Group VIIIB metal such as Fe; a Group IVB metal such as Ti; a Group IIB metal such as Zn, and combinations thereof. Certain additional metals may be added to a supported catalyst formulation to improve selected properties, or to modify the catalyst activity and/or selectivity. Suitable supported catalysts include catalysts useful in various reactor types, e.g., in fixed bed or ebullated bed reactors.

Catalysts suitable for use as the spent supported catalyst in the method are described in a number of publications, including U.S. Pat. Nos. 11,001,502; 10,913,054; 10,213,772; 9,920,260; 9,206,361; 7,803,266; 7,185,870; 7,449,103; 8,024,232; 7,618,530; 6,589,908; 6,667,271; 7,642,212; 7,560,407, 6,030,915, 5,980,730, 5,968,348, 5,498,586; and US Patent Publication Nos. 2011/0226667; 2009/0310435; 2011/0306490.

Prior to metal recovery, the spent supported catalyst may be treated to remove residual hydrocarbons such as oil, precipitated asphaltenes, other oil residues and the like. The spent supported catalyst (prior to deoiling) contains typically carbon fines, metal fines, and spent supported catalyst in unconverted resid hydrocarbon oil, with a solid content ranging from 5 to 50 wt. %. The deoiling process treatment may include the use of solvents for oil removal, and a subsequent liquid/solid separation step for the recovery of deoiled spent catalyst. The treatment process may further include a thermal treatment step, e.g., drying and/or pyrolysis, for removal of hydrocarbons from the spent supported catalyst. In other aspects, the deoiling may include the use of a sub-critical dense phase gas, and optionally with surfactants and additives, to clean/remove oil from the spent supported catalyst.

The spent supported catalyst after deoiling typically contains less than 5 wt. % hydrocarbons as unconverted resid, or, more particularly, less than 2 wt. % hydrocarbons, or less than 1 wt. % hydrocarbons. In some cases, the deoiled spent supported catalyst is substantially devoid of residual hydrocarbons, or is devoid of residual hydrocarbons, or comprises residual hydrocarbons in an amount of less than about 1000 ppm, or 500 ppm, or 100 ppm. The quantity of metals to be recovered from the de-oiled spent supported catalyst generally depends on the compositional make-up of the catalyst for use in hydroprocessing, e.g., a sulfided Group VIB metal catalyst, a bimetallic catalyst containing a Group VIB metal and a Group VIIIB metal, or a multi-metallic catalyst with at least a Group VIB and other (e.g., promoter) metal(s). After the oil removal treatment process, the spent supported catalyst containing metals for recovery may be in the form of a coke-like material, which can be ground accordingly for the subsequent metal recovery process if desired.

The deoiling or removal of hydrocarbons from spent catalysts is disclosed in a number of publications, including U.S. Pat. Nos. 7,790,646, 7,737,068, WO20060117101, WO2010142397, US20090159505A1, US20100167912A1, US20100167910A1, US20100163499A1, US20100163459A1, US20090163347A1, US20090163348A1, and US20060135631A1.

An illustration of a roasting and extraction method or process according to an embodiment of the invention is shown schematically in FIG. 1. Deoiled spent supported catalyst 11, e.g., catalyst that is devoid or substantially devoid of residual hydrocarbons, as described herein, is mixed 10 with potassium carbonate 12 and the blend 13 fed to a heating or roasting stage 20 to reduce the sulfur and/or carbon content present in the supported catalyst to less than pre-selected amounts and subsequently 23 to form a spent supported catalyst/potassium carbonate calcine from heat/roasting step, calcining stage 20. Heating and roasting may be conducted in the same or different equipment and as individual batch or continuous process steps. Thermal oxidation products of sulfur and carbon from the catalyst may be used to establish the amount of time needed for calcination (or the completion of the calcination step), as previously described. The spent supported catalyst calcine is subsequently mixed 30 with water 31 to form a spent supported catalyst/potassium carbonate calcine slurry 33 and to leach the water-soluble Group VIB metal compound and the water-soluble Group VB metal compound from the spent supported catalyst/potassium carbonate calcine. The spent supported catalyst/potassium carbonate calcine slurry 33 is separated 40 into a filtrate 43 and residue 44. A pH~10 deionized water wash 42 of the residue 44 may be applied. The filtrate comprises soluble Group VIB and Group VB metals and is separated for subsequent recovery of the Group VB and Group VIB metal compounds, e.g., in the case of vanadium and molybdenum, as $V_2O_5$ and $MoO_3$. Residue 44 comprising insoluble compounds (such as, e.g., Ni, Fe, residual Mo, V and other metal compounds) may also be further processed for possible metals recovery or sent to a smelter.

The heat/roast stage (20 in FIG. 1) includes a first heating step to remove residual hydrocarbons followed by a subsequent roasting step to form a calcine of the spent supported catalyst/potassium carbonate mixture. The heating step is conducted under inert conditions, e.g., at 500° C. for 1-2 hrs. For deoiled spent supported catalyst having a low content of residual hydrocarbons, e.g., less than about 1000 ppm, however, such as may be obtained for supported catalyst that has been pre-processed, the initial heating step under inert conditions to remove residual hydrocarbons may not be needed. While not limited thereto, the heating may comprise, e.g., a slow ramp to an initial temperature, e.g., in the range of 350-500° C., under an inert gas such as argon, for a suitable period of time (e.g., 1-2 hr) to remove residual hydrocarbons via pyrolysis. Following the heating step, the subsequent roasting step is conducted under oxidative conditions to remove carbon and sulfur and to form the spent catalyst/potassium carbonate calcine. Although shown as one stage in FIG. 1, the heating step and the roasting step may be conducted as separate sequential stages.

Calcining of the potassium carbonate/spent supported catalyst mixture is carried out in stage 20, typically by increasing the temperature to an appropriate calcination temperature, e.g., in the range of 600° C. to 650° C., or about 610° C. to 650° C., or about 610° C. to 630° C., or is greater than about 600° C., or about 610° C., or about 620° C., or about 630° C., or about 640° C., or about 650° C., under oxidative conditions for a suitable period of time to form a calcined spent supported catalyst (e.g., typically greater than 1-2 hr and less than about 24 hr, or more particularly, 0.5 to 12 hr, or 1 to 8 hr, or 4 to 8 hr, or less than about 12 hr, or 10 hr or 8 hr). The heating step may also include first heating under inert gas heating conditions at a temperature of less than about 600° C. or 550° C., or 500° C. or 450° C. for a pre-selected time in the range of about 0.5 to 4 hr, or 1 to 3 hr, or less than about 4 hr, or 2 hr. In general, the degree of oxidation of the calcined spent supported catalyst may also be monitored by thermal oxidation product analysis of $CO_2$ and $SO_2$ during calcination and establishing a suitable end point to the calcination. For example, an end point may be associated with $CO_2$ and $SO_2$ levels of less than about 1 wt. %, or about 0.8 wt. %, or about 0.5 wt. %, or about 0.2 wt. %, or about 0.1 wt. %. The thermal oxidation product gas may also be monitored by infrared detection targeting at least about 20 wt. % $O_2$, less than about 0.25 wt. % $CO_2$ and less than about 0.25 wt. % $SO_2$.

During the spent supported catalyst/potassium carbonate mixture calcination step (20 in FIG. 1), oxidative heating conditions may generally comprise heating in the presence of air, or a gas mixture comprising sufficient oxygen and air to maintain oxidative conditions. Variations in the oxidative conditions may be employed as needed, e.g., an initial gas environment comprising no more than about 20 vol. % oxygen may be followed by gas conditions comprising up to 80 vol. % oxygen may also be used.

During calcination of the spent supported catalyst/potassium carbonate mixture, e.g., when the supported catalyst comprises Mo, Ni, V, Fe, C, and S, the following representative reactions are believed to form the following compounds and thermal oxidation product gases:

$$MoS_2+3K_2CO_3+9/2O_2=K_2MoO_4+2K_2SO_4+3CO_2\uparrow \quad (1)$$

$$V_2S_3+4K_2CO_3+7O_2=2KVO_3+3K_2SO_4+4CO_2\uparrow \quad (2)$$

$$NiS+K_2CO_3+2O_2=NiO+K_2SO_4+CO_2\uparrow \quad (3)$$

$$2FeS+2K_2CO_3+9/2O_2=Fe_2O_3+2K_2SO_4+2CO_2\uparrow \quad (4)$$

$$C+O_2=CO_2\uparrow \quad (5)$$

$$S+O_2=SO_2\uparrow \quad (6)$$

$$K_2CO_3+SO_2+\tfrac{1}{2}O_2=K_2SO_4+CO_2\uparrow \quad (7)$$

$$NiMoO_4+K_2CO_3=K_2MoO_4+NiO+CO_2\uparrow \quad (8)$$

$$Ni_3(VO_4)_2+K_2CO_3=2KVO_3+3NiO+CO_2\uparrow \quad (9)$$

Spent catalyst combustion reactions in the presence of air, e.g., when the supported catalyst comprises Mo, Ni, V, Fe, C, and S, may also form the following compounds and thermal oxidation product gases:

$$V_2S_3+11/2O_2=V_2O_5+3SO_2\uparrow \quad (10)$$

$$MoS_2+7/2O_2=MoO_3+2SO_2\uparrow \quad (11)$$

$$2FeS+7/2O_2=Fe_2O_3+2SO_2\uparrow \quad (12)$$

$$NiS+3/2O_2=NiO+SO_2\uparrow \quad (13)$$

$$C+O_2=CO_2\uparrow \quad (14)$$

$$S+O_2=SO_2\uparrow \quad (15)$$

$$V_2S_3+3NiS+10O_2=Ni_3(VO_4)_2+6SO_2\uparrow \quad (16)$$

$$MoO_3+NiO=NiMoO_4 \quad (17)$$

Under some conditions, e.g., at temperatures between 500-600° C., certain reactions involving nickel and vanadium may occur preferentially and may lead to the formation of nickel vanadate. For example, reaction (16) may predominate over reaction (13). The formation of a spinel phase, e.g., $NiMoO_4$, may also occur (reaction 17). The spinel phase is unavoidable as its formation begins at a temperature of approximately 250° C. or well before complete S and C oxidation can be fully realized.

Following calcination, the spent supported catalyst/potassium carbonate calcine is contacted with water to form a slurry of the potassium carbonate calcine. Leaching in water is conducted to extract soluble metal compounds, forming a filtrate and an insoluble metal compound(s) residue comprising insoluble Group VIIIB/Group VIB/Group VB metal compound(s). The filtrate typically comprises soluble molybdate and/or vanadate compounds while the insoluble compounds typically comprise certain metal and mixed metal compounds. In the case of the foregoing representative reactions (1) to (9), such insoluble metal compounds are believed to include nickel oxide, nickel molybdate and nickel vanadate mixed metal compounds.

The reaction of certain insoluble Group VB and Group VIB metal compounds (referred to as a "spinel") with potassium carbonate, in the case of Mo and V metal compounds, may include reactions (8) and (9):

$$NiMoO_4+K_2CO_3\rightarrow K_2MoO_4+NiO+CO_2\uparrow \quad (8)$$

$$Ni_3(VO_4)_2+K_2CO_3=2KVO_3+3NiO+CO_2\uparrow \quad (9)$$

Any refractory and un-leachable $NiMoO_4$ formed, e.g., from $MoO_3$ and NiO (reaction 17), may be modified, at least partially, to water soluble molybdate in the presence of alkali (reaction 8). Similarly, any refractory and un-leachable $Ni_3(VO_4)_2$ formed, e.g., from V and Ni sulfides (reaction 16), may be modified, at least partially, to water soluble vanadate in the presence of alkali (reaction 9).

While not necessarily limited thereto, typical leach conditions comprise a leach temperature in the range of about 60 to 90° C., or 60 to 80° C., or 70 to 80° C., or greater than about 60° C., or 70° C.; a leach time in the range of about 1-5 hr, or about 2-5 hr, or about 2-4 hr.; and a leach pH in the range of about 9.5 to 11, or about 10 to 11, or about 10 to 10.5. The slurry leach of the spent supported catalyst/potassium carbonate calcine may be conducted with or without pH modification as long as the pH of the calcine slurry is greater than 9.5.

In general, up to about 95% extraction of both the Group VIB (e.g., Mo) and the Group VB (e.g., V) metals from the spent supported catalyst into the solution phase is possible. The filtrate generally contains greater than about 70 wt. %, or 75 wt. %, or 80 wt. %, or 85 wt. %, or 90 wt. %, or 95 wt. % of the Group VIB metal or greater than about 50 wt. %, or 60 wt. %, or 70 wt. %, or 80 wt. %, or 90 wt. %, or 95 wt. % of the Group VB metal originally present in the deoiled spent supported catalyst, or both greater than about 70 wt. %, or 75 wt. %, or 80 wt. %, or 85 wt. %, or 90 wt. %, or 95 wt. % of the Group VIB metal and greater than about 50 wt. %, or 60 wt. %, or 70 wt. %, or 80 wt. %, or 90 wt., or 95 wt. % of the Group VB metal originally present in the deoiled spent supported catalyst. In some cases, the filtrate comprises potassium molybdate, potassium vanadate, or a mixture thereof.

The residue from the water leaching/extraction stage typically comprises Group VB and/or Group VIB and/or Group VIIIB metal oxide solids. The residue is subsequently separated from the filtrate and dried under suitable conditions.

Figure 2:
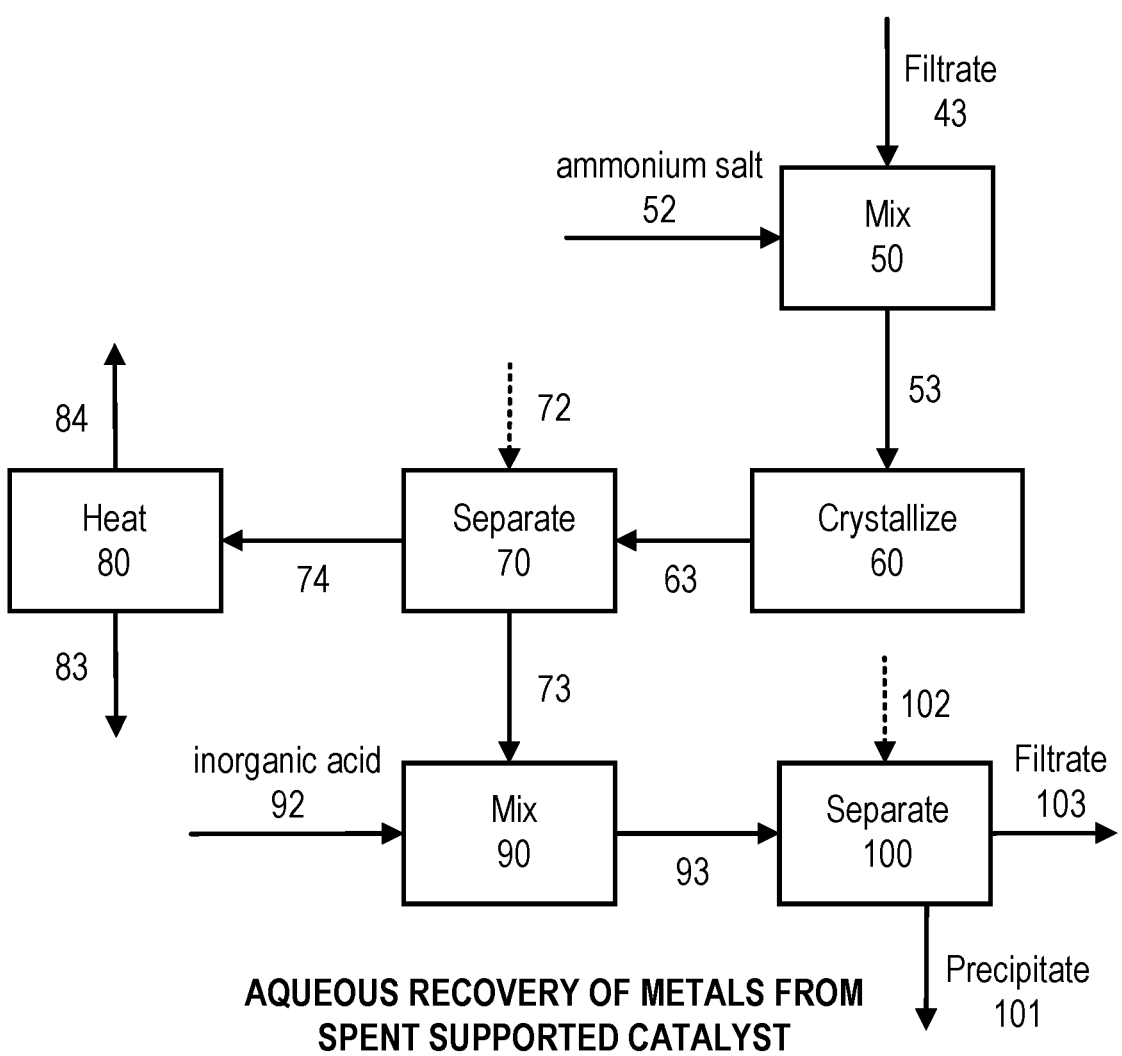
FIG. 2 is a general block diagram schematic illustration of an embodiment of a aqueous recovery method to recover metals from deoiled spent supported catalyst according to the invention.

An illustration of an aqueous recovery method or process according to an embodiment of the invention is shown schematically in FIG. 2. Filtrate 43 from one or more sources, e.g., spent supported catalyst filtrate stream 43 from the method shown in FIG. 1 comprising a Group VIB metal compound and Group VB metal compound aqueous mixture is mixed 50 with an ammonium salt 52 under metathesis reaction conditions to convert the metal compounds to ammonium Group VB metal and ammonium Group VIB metal compounds. The metathesis reaction mixture is subsequently subjected to crystallization conditions 60 effective to crystallize the ammonium Group VB metal compound. The crystallized ammonium Group VB metal compound is subsequently routed 63 for separation 70 and recovery of the ammonium Group VB metal compound and an ammonium Group VIB metal compound filtrate 73. A saturated ammonium Group VB metal compound wash solution 72 at a pre-selected wash temperature may be used as necessary for filtering and washing of the ammonium Group VB metal compound crystals. The ammonium Group VB metal compound is subsequently directed 74 to heating 80 and ammonia removal under conditions effective to release ammonia and for separately recovering the Group VB metal compound 83 and ammonia 84. The ammonium Group VIB metal compound filtrate 73 from the separation step 70 is subsequently forwarded for mixing 90 with an inorganic acid 92 under conditions effective to form a mixture of a Group VIB metal oxide compound precipitate and an ammonium salt of the inorganic acid. The mixture of the precipitate and salt are subsequently conveyed 93 for separation 100 and recovery of the Group VIB metal oxide compound precipitate 101. An ammonium Group VIB metal oxide compound wash solution 102 at a pre-selected wash temperature may be used as necessary for filtering and washing of the Group VIB metal oxide compound precipitate 101. The filtrate 103 from separation 100 typically contains <1,000-mg/L Mo, <100 mg/L V, up to 40,000 mg/L of $K^+$ ion and up to 15,000 mg/L $NH_4^+$ ion and may be subjected to iron precipitation for residual metals (Mo and V) removal. The transition metals depleted solution may subsequently be subjected to cooling crystallization under vacuum to optionally produce a blend of agricultural grade $KNO_3$ and $NH_4NO_3$ fertilizer chemicals.

Mixing (50 in FIG. 2) of the filtrate (43 in FIG. 2) with the ammonium salt (52 in FIG. 2) is typically conducted under conditions that are effective to convert the Group VIB and Group VB metal compounds into ammonium Group VB metal and ammonium Group VIB metal compounds. Seed crystals such as ammonium metavanadate (AMV) may be used, typically in a concentration of about 2000-8000 ppm, or 4000-6000 ppm, or about 5000 ppm. Typically, the pH range is less than about 8 when AMV seed is introduced. Although the skilled artisan may readily determine suitable methods to conduct the metathesis reaction, one useful procedure is to first reduce the pH to about 9 using an inorganic acid, e.g., nitric acid, followed by the introduction of ammonium nitrate and the introduction of AMV seed at a pH of less than about 8, preferably 8 or less, or in the range of 7.5 to 8.5, or 7.5 to 8, or about 8. Metathesis reaction conditions may also include a temperature in the range of less than about 80° C., or less than about 70° C., or about 50 to 70° C., or 55 to 65° C., or about 60° C.; and/or a reaction time in the range of about 0.25 to 2 hr, or about 0.25 to 1.5 hr, or about 0.5 to 1.5 hr, or about 1-2 hr. In some cases, the metathesis reaction conditions comprise the sequential steps of adjusting the pH of the aqueous mixture to a range of about 8 to about 9, adding the ammonium salt to the aqueous mixture, and adding ammonium Group VB metal compound seed at a pH in the range of about 7.5 to 8.5, preferably about 8, to the aqueous mixture.

During mixing of the filtrate and metathesis reactions occurring thereof, e.g., when the filtrate is derived from a spent supported catalyst comprising, e.g., Mo, Ni, V, Fe, C, and S, the following representative reactions are believed to form soluble (Mo) and (V) metal compounds at the hot temperatures:

$$NH_4NO_3 + KVO_3 \rightarrow NH_4VO_{3\downarrow} + KNO_3 \qquad (18)$$

$$2NH_4NO_3 + K_2MoO_4 \rightarrow (NH_4)_2MoO_4 + 2KNO_3 \qquad (19)$$

The crystallization conditions, e.g., when ammonium metavanadate (AMV) crystals are to be produced, typically involve reduced temperature and pressure, e.g., a temperature of about 10° C. under a vacuum of about 21 in. Hg may be used. The skilled artisan will appreciate that different temperature and pressure (vacuum) conditions and crystallization times may be used as AMV solubility decreases with temperature. In general, a temperature in the range of greater than 0° C. to about 15° C., or greater than 0° C. to about 10° C., vacuum conditions, and a crystallization time period of about 1 hr to about 6 hr, or about 1 hr to about 4 hr, or about 1 hr to about 3 hr are useful. Filtration and washing of the crystals with wash solution at lowered temperatures, e.g., an AMV wash solution of about 5000 ppm V at about 10° C. may be used. Multiple washes of about 2-5 times, or about 3 times along with recycling of the wash solution to the crystallization step may be used as well. Typically, a wash temperature in the range of greater than 0° C. to about 15° C., or greater than 0° C. to about 10° C., or a wash solution temperature of about 10° C., has been found to be suitable, preferably wherein the crystallized ammonium Group VB metal compound and the wash solution comprise ammonium metavanadate and, optionally, wherein the wash solution is recycled for crystallization of the ammonium Group VB metal compound. In general, the ammonium Group VB metal compound wash solution comprises the same ammonium Group VB metal compound as the crystallized ammonium Group VB metal compound, or wherein the ammonium Group VB metal compound of the wash solution is the same ammonium Group VB metal compound as the crystallized ammonium Group VB metal compound.

The ammonium Group VB metal compound may be subsequently processed according to standard procedures, e.g., heating at a temperature in the range of about 200-450° C., or 300-450° C., or 350-425° C., or about 375-425° C. for a time sufficient to release ammonia in an amount of at least about 90%, or 95%, or 98%, or 99% of the amount present in the ammonium Group VB metal compound. The Group VB metal compound may be subsequently further treated, e.g., melted in a fusion furnace and the melt discharged to a flaker wheel to produce Group VB metal compound flake. The overall recovery of the Group VB metal present in the de-oiled spent supported catalyst comprising the Group VIB and Group VB metal compounds may be greater than about 85 wt. %, or about 90 wt. %, or about 95 wt. %.

The acidulation conditions for contacting of the ammonium Group VIB metal compound filtrate with an inorganic acid comprise introducing the inorganic acid at a temperature in the range of about 50-80° C., or 50 to 70° C., or 55 to 70° C. to provide a pH of about 1 to 3, or about 1 to 2, or about 1, and a reaction time period of about 1 hr to about 4 hr, or about 1 hr to about 3 hr, or about 1 hr to about 2 hr preferably wherein the inorganic acid comprises nitric acid or sulfuric acid, or is nitric acid.

During the acidulation reactions, e.g., when the filtrate is derived from a spent supported catalyst comprising, e.g., Mo, Ni, V, Fe, C, and S, the following representative reaction is believed to form an insoluble (Mo) metal compound:

$$(NH_4)_2MoO_4 + 2HNO_3 + H_2O \rightarrow MoO_3 \cdot 2H_2O\downarrow + 2NH_4NO_3 \qquad (20)$$

Following the acidulation reaction, the slurry was cooled and separation of the liquid and solid may be conducted using filtration. The conditions for washing of the Group VIB metal oxide compound precipitate may be conducted by re-slurrying the filter cake, at 25-wt % solids with an ammonium Group VIB metal compound wash solution at a wash temperature in the range of greater than 0° C. to about 15° C., or greater than 0° C. to about 10° C., or a wash solution temperature of about 10° C. at pH⁻1.0 for 15-minutes. Typically, when the spent catalyst comprises Mo as the Group VIB metal, the wash solution comprises ammonium heptamolybdate (AHM) at pH 1.0 that is depleted of molybdenum. Following re-filtration of the slurry, the cake may be re-slurried two more times with fresh pH 1.0 ammonium heptamolybdate solution to lower K content in the $MoO_3$ cake to <0.5-wt %. As with all wash steps, the wash solution may be optionally recycled for washing, e.g., of the Group VIB metal oxide compound. In general, the ammonium Group VIB metal oxide compound wash solution comprises the same ammonium Group VIB metal oxide compound as the precipitated ammonium Group VIB metal oxide compound, or wherein the ammonium Group VIB metal oxide compound of the wash solution is the same ammonium Group VIB metal oxide compound as the precipitated ammonium Group VIB metal compound.

Figure 3:
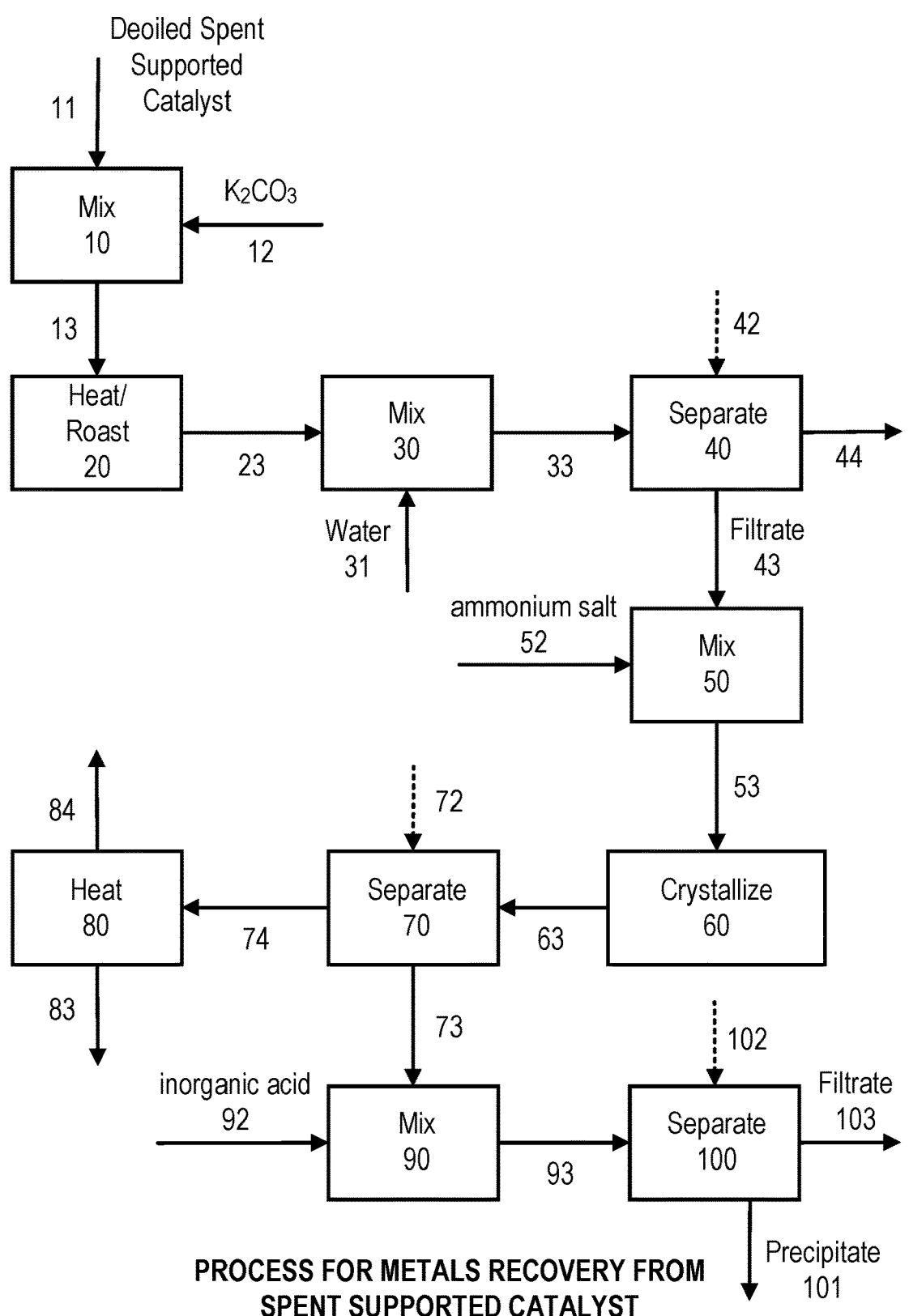
FIG. 3 is a general block diagram schematic illustration of an embodiment of a combined roasting/extraction and aqueous recovery process to recover metals from deoiled spent supported catalyst according to the invention.
Figure 4:
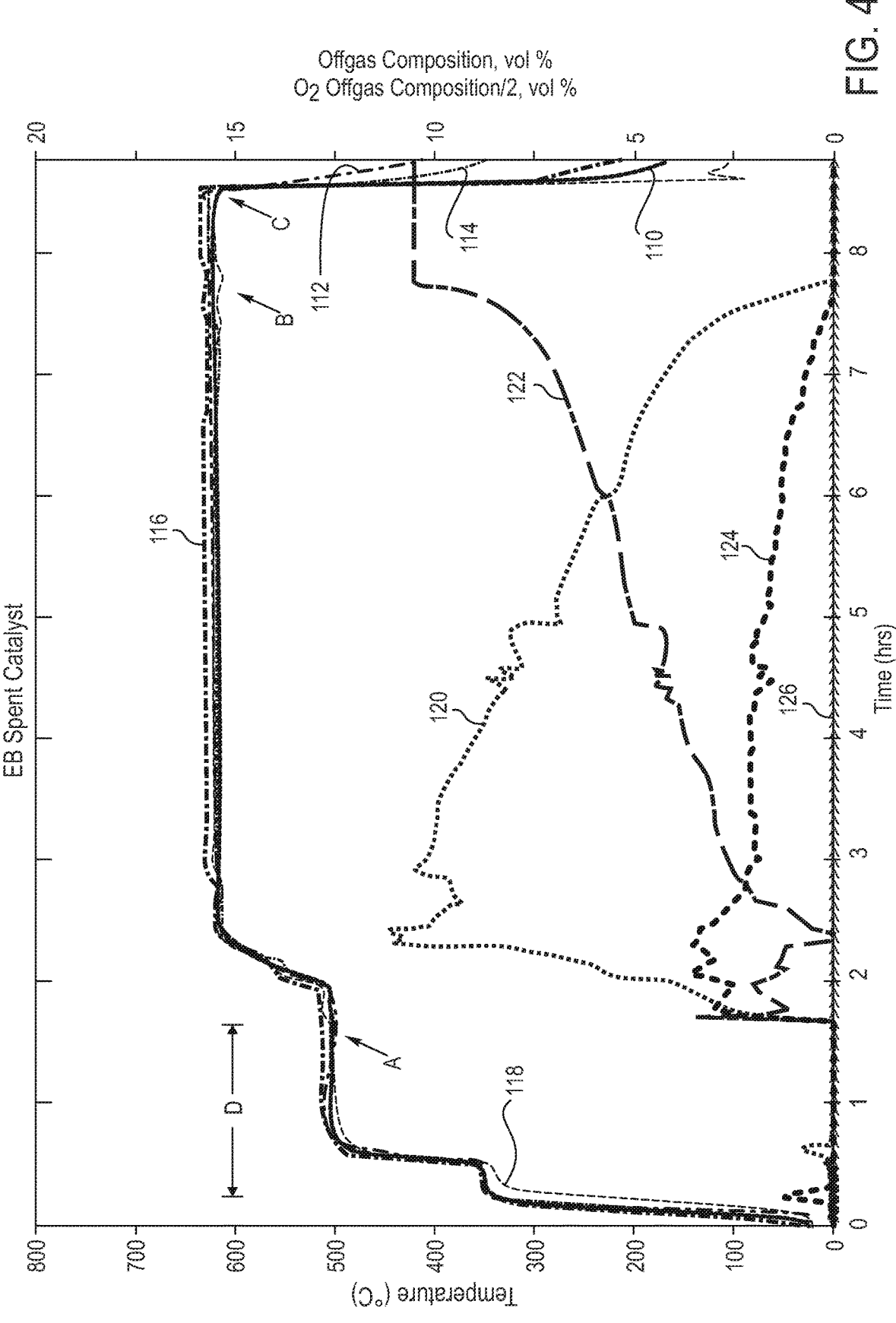
FIGS. 4, 5, 6,7, 8, and 9 provide thermal and off gas results in accordance with the examples.
Figure 5:
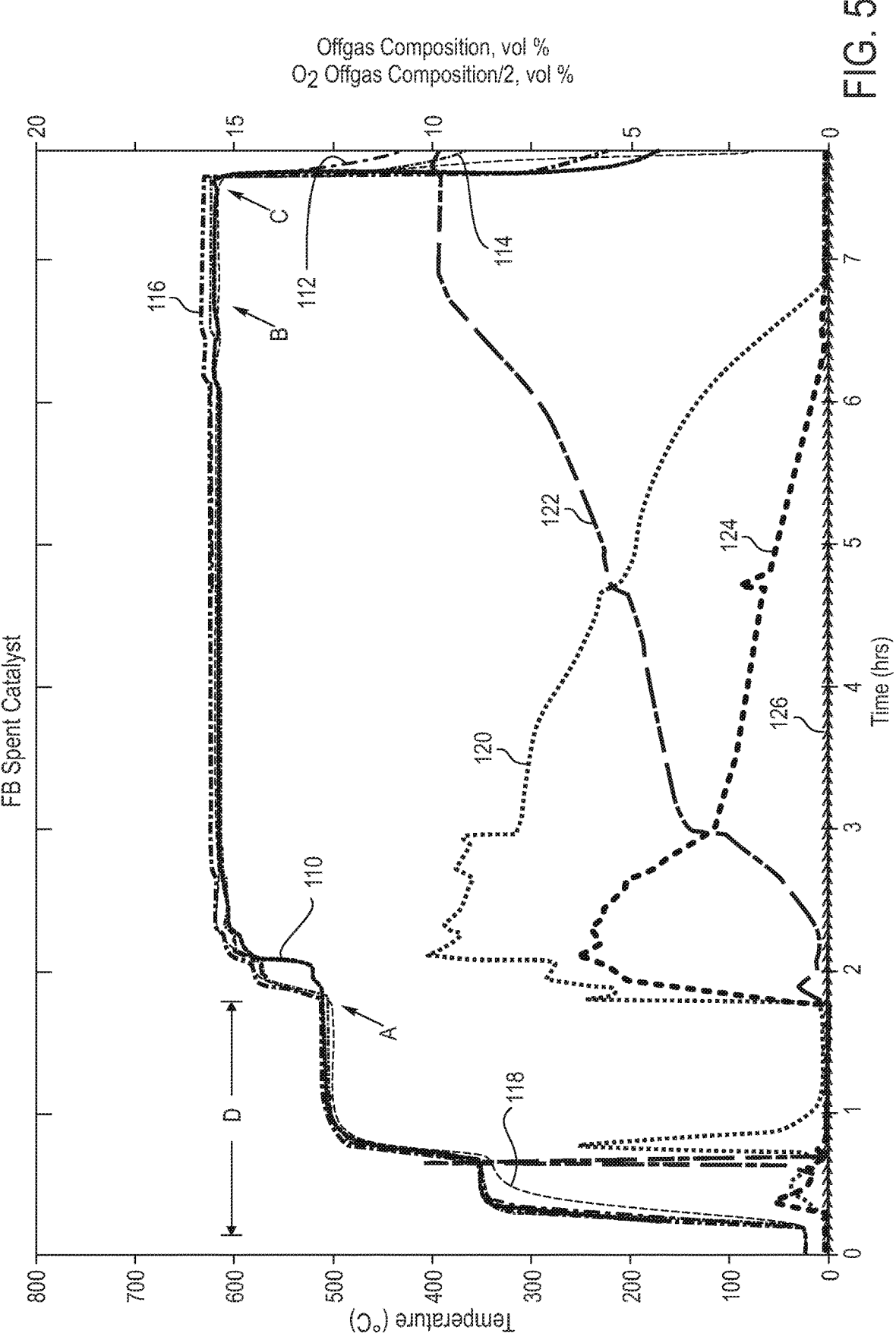
Figure 6:
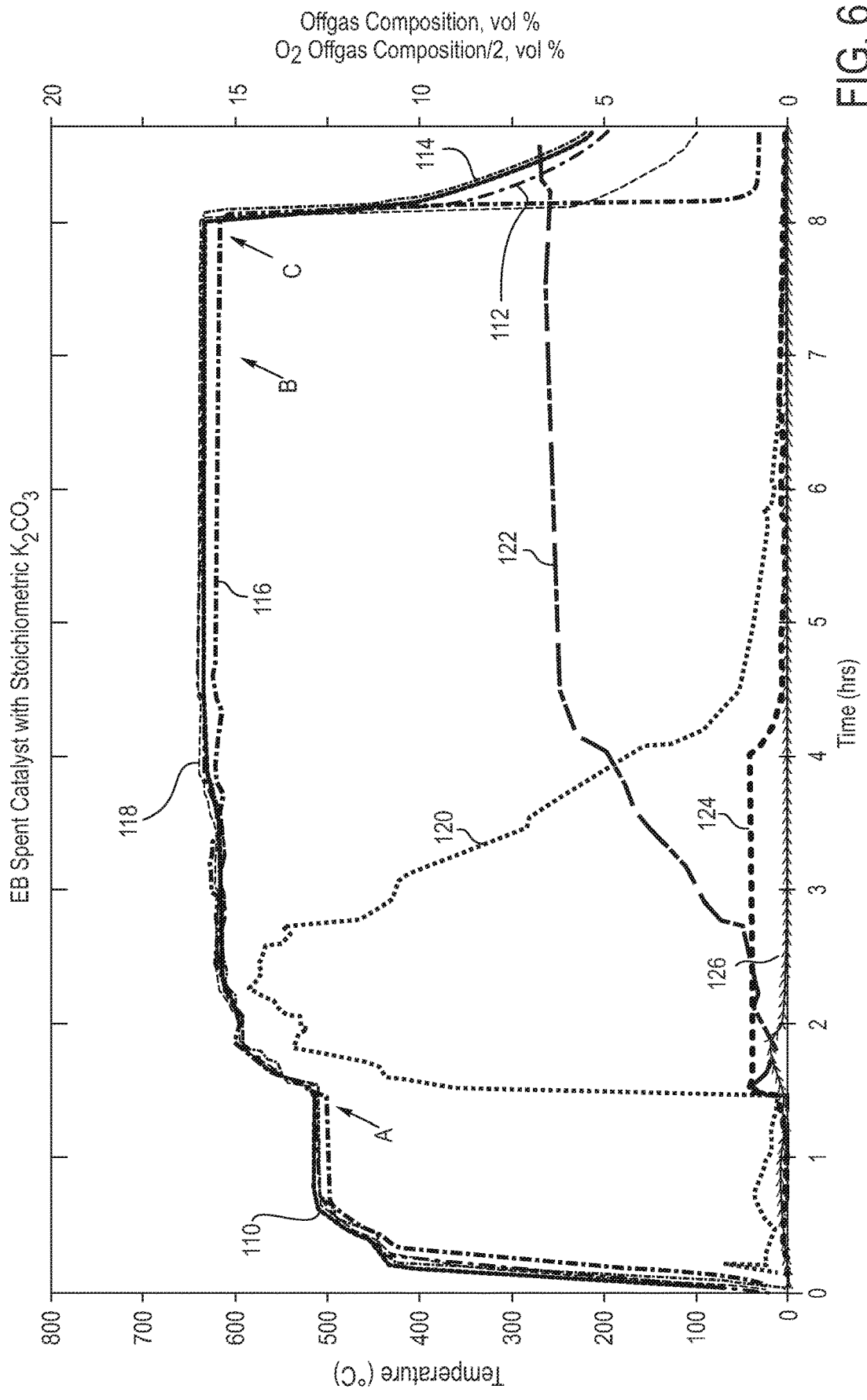
Figure 7:
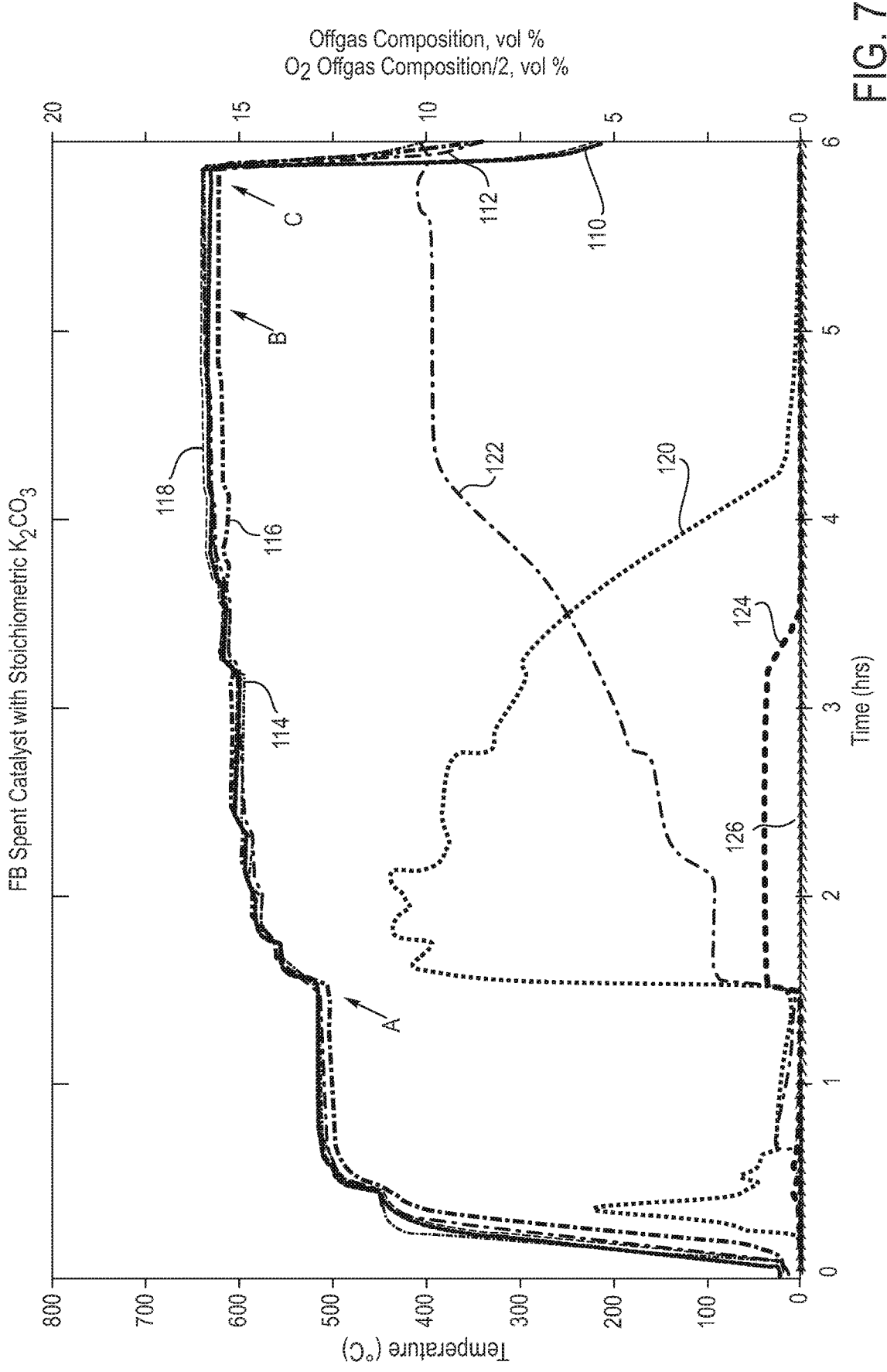
Figure 8:
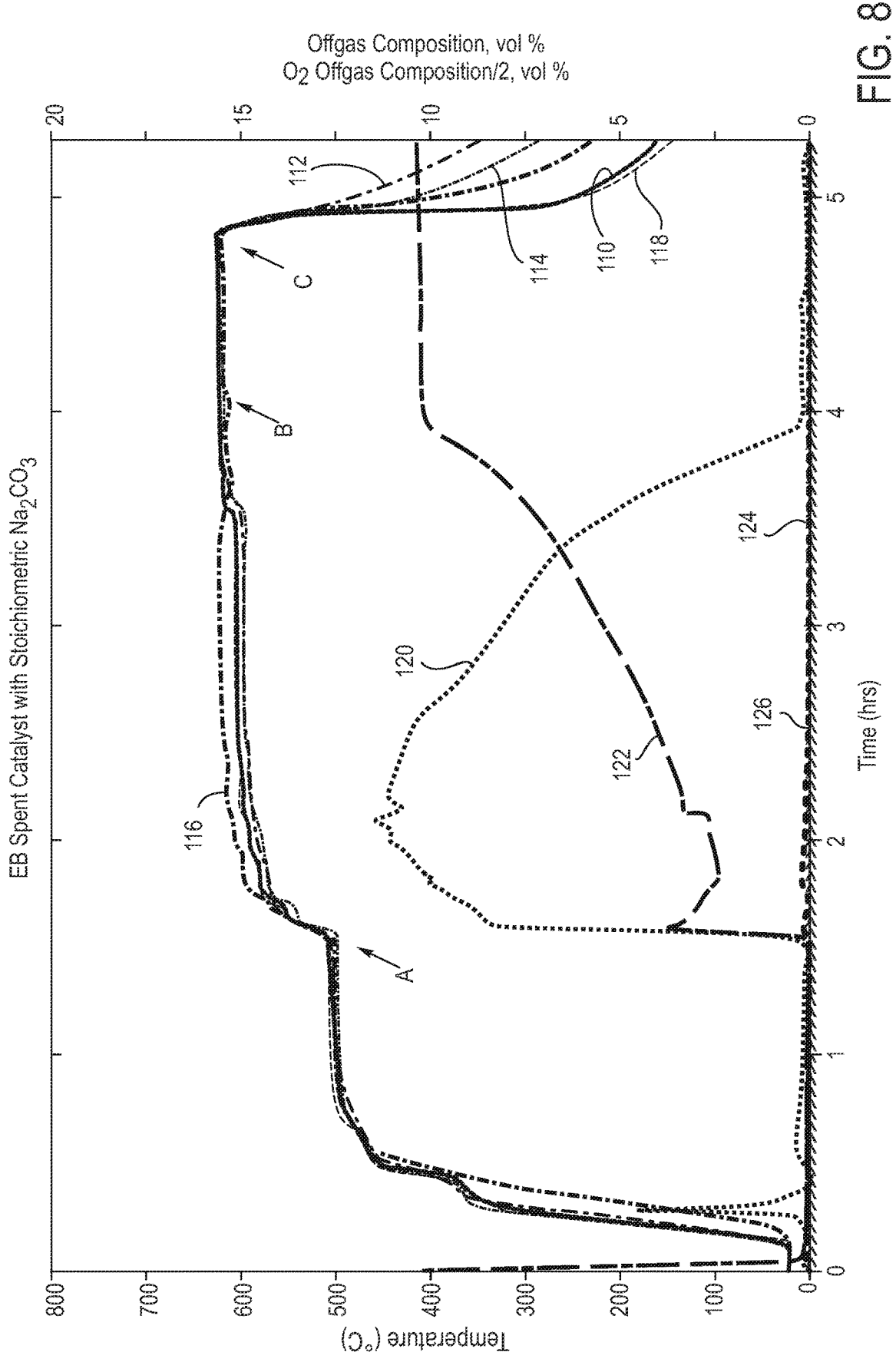
Figure 9:
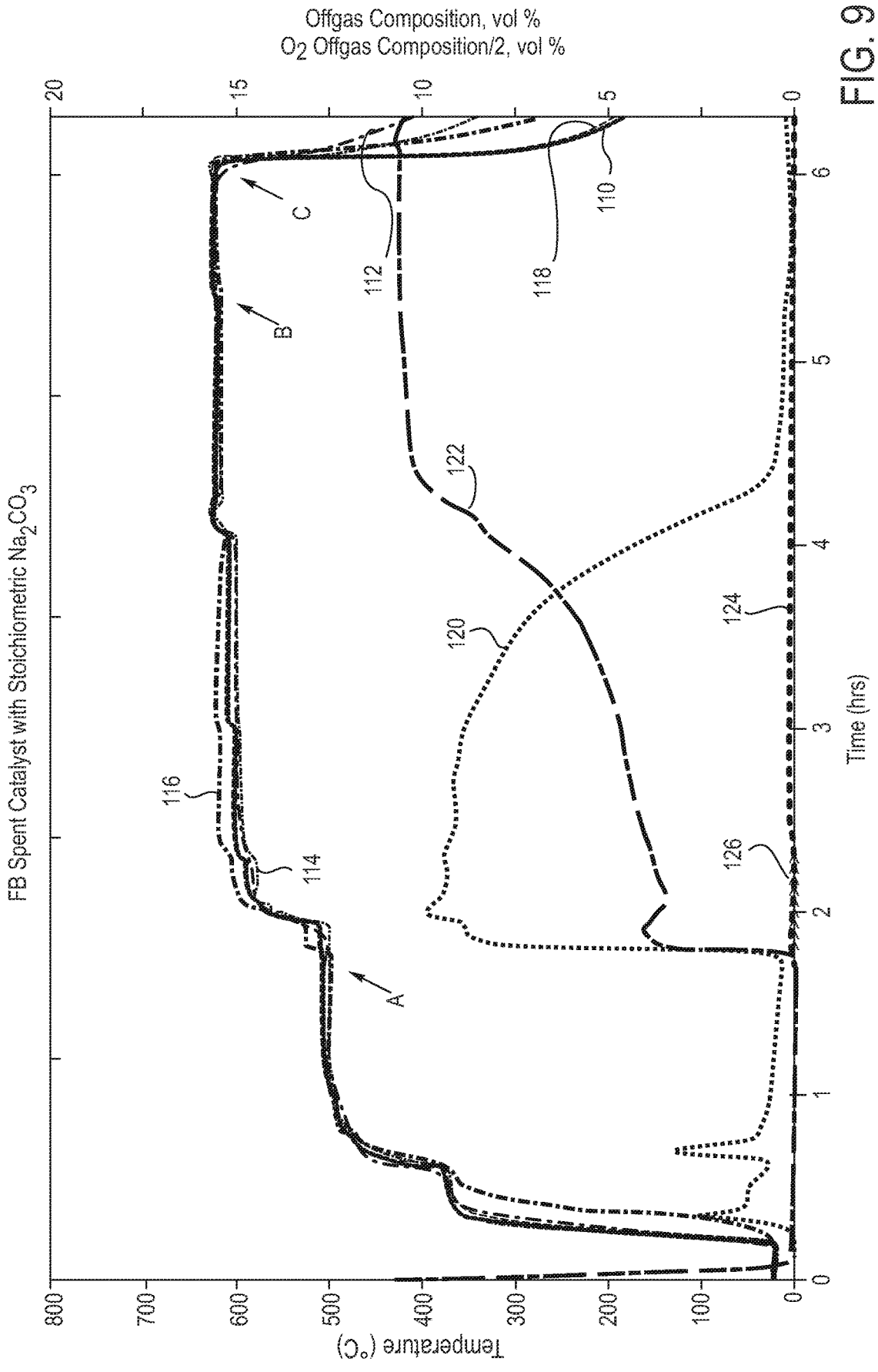

The overall recovery of the Group VIB metal present in the de-oiled spent supported catalyst comprising the Group VIB and Group VB metal compounds may be greater than about 85 wt. %, or about 90 wt. %, or about 95 wt. %. FIG. 3 depicts the combined process schematic of the roasting and extraction method shown in FIG. 1 with the aqueous recovery method shown in FIG. 2. The foregoing descriptions for each of FIGS. 1 and 2 are directly applicable to the combined process schematic shown in FIG. 3.

EXAMPLES

The following examples provide results for metals recovery from spent supported catalysts in accordance with the claimed invention. Results for metal recovery using potassium carbonate (potash) in accordance with embodiments of the invention are provided along with comparative results that do not utilize potassium carbonate. Comparative results using sodium carbonate rather than potassium carbonate are also presented.

Reference (comparative) Examples 1A and 1B provide results for as-is roasting of spent supported catalyst, followed by potassium hydroxide (caustic potash) leaching of the calcine. Both fixed bed (FB) and ebullated bed (EB) supported catalysts were used in Examples 1A and 1B.

Examples 2A and 2B provide results for roasting of spent supported EB and FB catalyst-sodium carbonate mixtures and hot water leaching of the supported catalyst-sodium carbonate calcine.

Comparative Examples 3A and 3B provide results for roasting of spent supported EB and FB catalyst-potassium carbonate mixtures and hot water leaching of the supported catalyst-potassium carbonate calcine.

Example 4A provides crystallization results of each of the leach filtrates from examples 1B, 2B, and 3B after metathesis reaction completion for Group VB metal recovery. Example 4B provides results for Group VIB metal recovery following metal precipitation and recovery from each of the remaining Group VB metal barren solutions from Example 4A.

A rotary quartz tube furnace was used for controlled batch oxidation of deoiled spent catalyst samples. The tube furnace contained three zones, with furnace zones 1, 2, and 3 located along the length of the tube furnace; zone 1 being the feed entrance left third of the furnace, zone 2 being the mid-section middle third of the furnace, and zone 3 being the discharge right third of the tube furnace. FIG. 4 to FIG. 9 provide thermal and offgas results as described in the Examples. In each of FIG. 4 to FIG. 9, the number and letter identifiers are described as follows:

Identifier Key for FIGS. 4 to 9

| Identifier | Description |
|---|---|
| 110 | Furnace Zone 1 |
| 112 | Furnace Zone 2 |
| 114 | Furnace Zone 3 |
| 116 | Furnace Shell |
| 118 | Furnace Bed |
| 120 | $CO_2$ Offgas composition, vol. % |
| 122 | $O_2$ Offgas composition/2, vol. % |
| 124 | $SO_2$ Offgas composition, vol. % |
| 126 | CO Offgas composition, vol. % |
| A | Start of Air Flow |
| B | Final 45 min. hold, 620° C. |
| C | End of Test |
| D | Argon Gas Feed period |

Example 1A—Roasting Spent Supported Ebullated Bed (EB) and Fixed Bed (FB) Catalyst (as-is)

Controlled batch oxidation of up to 260 g deoiled spent catalyst under 3 to 5 standard liter per minute air flow in a 4 in. diameter×14 in. operating length rotary quartz tube furnace at between 600° C. and 625° C., simulating multiple hearth furnace conditions, with retention times of up to 8 hrs generated calcines containing an average of <0.1 wt. % C and <0.7 wt. % S, respectively.

The run began with a fast ramp-up to 500° C. under Argon gas flow to remove residual hydrocarbons in the spent catalyst. This was followed by a slow ramp to the operating bed temperature of 620° C. under 3 slpm air flow, an extended hold period under 4 slpm air with $CO_2$ and $SO_x$ emission measurements, followed by a slow cool down under excess air flow during reaction termination; the staged temperature control was a necessity to avoid significant heat release that would result in Mo loss and solids sintering.

A weight loss of up to 26% (Tables 7 and 8) was observed in EB and FB spent catalyst calcine that corresponded to near complete S (<0.7 wt. %) and C removal (<0.06 wt. %) together with conversion of metal sulfides to metal oxides.

Tables 1 and 2 provide metal assay results on roaster spent supported catalyst feed and generated calcine.

TABLE 1

| | | | | | | | | | |
|---|---|---|---|---|---|---|---|---|---|
| Roaster Spent Supported Catalyst Feed Average Assays (wt. %) | | | | | | | | | |
| Catalyst type | Mo | Ni | V | V/Ni molar ratio | Fe | Al | C | H | S |
| EB spent | 3.05 | 3.89 | 12.13 | 3.64 | 0.50 | 21.50 | 16.53 | 1.01 | 16.32 |
| FB spent | 3.09 | 4.30 | 13.81 | 3.70 | 0.69 | 21.66 | 15.37 | 1.04 | 18.21 |

TABLE 2

| | | | | | | | | |
|---|---|---|---|---|---|---|---|---|
| Roaster Calcine Average Assays (wt. %), w/o alkali | | | | | | | | |
| Catalyst type | Mo | Ni | V | V/Ni molar ratio | Fe | Al | C | S |
| EB calcine | 4.05 | 5.16 | 16.33 | 3.64 | 0.66 | 28.53 | 0.02 | 0.24 |
| FB calcine | 4.11 | 5.73 | 18.38 | 3.70 | 0.92 | 28.83 | 0.05 | 0.69 |

Reactions (1.1) through (1.6) below represent the pertinent combustion reactions. Gibb's free energies at 600° C. imply oxidation per the sequence V>Mo>Fe>Ni; free energies at 600° C. for $CO_2$ and $SO_2$ suggest that C will combust at a faster rate than S.

| | | |
|---|---|---|
| $V_2S_3 + 11/2O_2 = V_2O_5 + 3SO_2\uparrow$ | (1.1) | $\Delta G_{873°K} = -1{,}585$ kJ/g · mol |
| $MoS_2 + 7/2O_2 = MoO_3 + 2SO_2\uparrow$ | (1.2) | $\Delta G_{873°K} = -879$ kJ/g · mol |
| $2FeS + 7/2O_2 = Fe_2O_3 + 2SO_2\uparrow$ | (1.3) | $\Delta G_{873°K} = -484$ kJ/g · mol |
| $NiS + 3/2O_2 = NiO + SO_2\uparrow$ | (1.4) | $\Delta G_{873°K} = -375$ kJ/g · mol |
| $C + O_2 = CO_2\uparrow$ | (1.5) | $\Delta G_{873°K} = -396$ kJ/g · mol |
| $S + O_2 = SO_2\uparrow$ | (1.6) | $\Delta G_{873°K} = -298$ kJ/g · mol |

An unexpected phase detected by XRD included nickel vanadate in the as-is calcined roaster feed (without alkali). The absence of NiO and the presence of $Ni_3(VO_4)_2$ indicated that reactions (1.7) through (1.9) below took precedence over reaction (1.4) and were occurring between 500° C. and 600° C.+ in the presence of air with reaction spontaneity decreasing marginally with increasing temperature.

| | | |
|---|---|---|
| $V_2S_3 + 3NiS + 10O_2 = Ni_3(VO_4)_2 + 6SO_2\uparrow$ | (1.7) | $\Delta G_{773°K} = -2{,}823$ kJ/ g · mol |
| $V_2S_3 + 3NiS + 10O_2 = Ni_3(VO_4)_2 + 6SO_2\uparrow$ | (1.8) | $\Delta G_{823°K} = -2{,}789$ kJ/g · mol |
| $V_2S_3 + 3NiS + 10O_2 = Ni_3(VO_4)_2 + 6SO_2\uparrow$ | (1.9) | $\Delta G_{873°K} = -2{,}754$ kJ/g · mol |
| $MoO_3 + NiO = NiMoO_4$ | (1.10) | $\Delta G_{873°K} = -20$ kJ/g · mol |

These S oxidation reactions were borne out by observation of the thermal oxidation product gas compositions for the roasting sequence (FIGS. 4 and 5) of EB and FB spent supported catalyst. A maximum $SO_2$ evolution of up to 3 vol. % for EB spent catalyst and up to 6 vol. % for RDS spent catalyst was observed within the first hour of oxidation indicating a combination of reaction progressions (1.7) through (1.9). Up to 26% of total S in the feed and present in the Ni—V stoichiometry in the stated reactions was likely combusted to $SO_2$ within the first hour following hydrocarbon removal under Argon at 500° C. Minor amounts of a spinel phase $NiMoO_4$ was also detected in the diffraction patterns (reaction 1.10); this phase is un-leachable in caustic potash or caustic soda. Nickel vanadate dissolution is also minimal under both alkaline and acidic conditions.

Example 1B—Calcine Leaching with Caustic Potash (KOH)

Calcines were used as-is and ground to 100% passing 65-Tyler for the leach. Caustic potash (KOH, 15 wt. % solution) leaching of both the EB and FB calcines of Example 1A at the two particle size distributions were performed at 75° C., 15 wt. % solids, pH 10.0 to 11.0 and retention times of 3 hrs. The leach residues were vacuum filtered, washed, dried and submitted for analytics. The leach solutions were set aside for near term hydrometallurgical separation of V from Mo (see Examples 4A and 4B).

Table 3 denotes that for EB calcine, the ground 65-Tyler mesh material mostly yielded higher metal (Mo and V) extractions; FB calcine did not appear to yield higher metal extractions at the finer size 65-Tyler mesh fraction.

Both Table 3 kinetic extractions and Table 4 leach residues indicate that Mo and V extractions were superior with EB calcine by up to 5% Mo and up to 15% V as compared to the FB calcine. It is thought the improved metal extractions from EB calcined spent catalyst may be due to fluidization of the catalyst in the reactor bed with superior mixing characteristics and frequent replacement of EB spent catalyst in a refinery setting. By comparison, in static bed configurations such as in FB reactors, supplementary contaminant build-up, longer change-out periods for FB catalyst, and concurrent metal locking in spent catalyst material, may lead to greater difficulty in metal extractions thereof.

In Table 2, calcine V/Ni molar ratios indicate that for both EB and FB calcines, if all Ni present were to tie-up V as un-leachable nickel vanadate, and no other encapsulation mechanisms existed, no more than 82% V leaching would be possible. Table 3 data suggests this observation appears to hold true for as-is EB calcine whereas the V lock-up is considerably higher with as-is FB calcine. Table 4 also supports the understanding that based on molar V/Ni ratio, the degree of V lock-up as refractory un-leachable nickel vanadate is significantly greater with FB type spent catalyst as compared to EB type spent catalyst.

XRD scans of the leach residue verified the insolubles as primarily $Al_2O_3$, $Ni_3(VO_4)_2$, $Fe_2O_3$, and small amounts of $\alpha$-$NiMoO_4$. C and S residuals in the leach residue, determined by Leco analyses, averaged <0.1 wt. %.

Up to 5% dissolution of total Al present in the calcine was observed at the alkaline potash pH. Fe dissolution of up to 30% was also detected under alkaline conditions. It is believed the polynuclear complex $Fe(OH)_4^{-1}$ existing at pH>10.0, contributed to iron solubility.

For both EB and FB ground calcines, up to 50% dissolution (Tables 5 and 6) of the EB and FB calcine mass in KOH was observed with the remaining mass constituting insolubles in the washed leach residue.

Tables 7 and 8 provide theoretical metals mass balance per unit operation for both EB and FB prototypes. As noted, EB Mo and V extractions were up to 5% and 15% higher than corresponding FB Mo and V extractions, respectively. Both Mo and V extractions were ~5% higher in the ground EB calcine against the as-is calcine with minimal differences observed in the ground versus as-is FB calcine. All subsequent tests employed grinding of the calcine to 100% passing 65 Tyler mesh.

TABLE 3

| | KOH Leach, Kinetic Period Extractions | | | | | |
|---|---|---|---|---|---|---|
| | Mo (%) @ Time (min) | | | V (%)@ Time (min) | | |
| Calcine type | 60 | 120 | 180 | 60 | 120 | 180 |
| EB calcine (as-is) | 59.9 | 73.8 | 81.7 | 51.3 | 65.6 | 73.7 |
| EB calcine (65M Tyler) | 73.0 | 75.8 | 85.2 | 68.4 | 70.3 | 81.0 |
| FB calcine (as-is) | 55.5 | 60.5 | 79.7 | 44.4 | 58.5 | 68.0 |
| FB calcine (65M Tyler) | 66.0 | 75.3 | 79.8 | 56.5 | 61.0 | 65.1 |

TABLE 4

| Calcine type | Mo | V | Ni | V/Ni molar Ratio | Fe | Al | P | Ca | K | Na | C | S |
|---|---|---|---|---|---|---|---|---|---|---|---|---|
| | KOH Leach Residue (wt. %) | | | | | | | | | | | |
| EB Calcine (As-Is) | 0.904 | 5.410 | 6.340 | 0.98 | 0.424 | 37.300 | 0.029 | 0.139 | 1.250 | 0.085 | 0.066 | 0.021 |
| EB Calcine (65 Tyler) | 0.912 | 4.640 | 6.610 | 0.81 | 0.513 | 39.100 | 0.001 | 0.157 | 0.748 | 0.054 | 0.041 | 0.039 |
| FB Calcine (As-Is) | 1.140 | 8.470 | 6.470 | 1.51 | 0.810 | 34.200 | 0.140 | 0.188 | 1.070 | 0.121 | 0.028 | 0.040 |
| FB Calcine (65 Tyler) | 1.045 | 7.953 | 6.643 | 1.38 | 0.845 | 33.675 | 0.101 | 0.180 | 0.976 | 0.171 | 0.028 | 0.099 |

TABLE 5

| EB Spent Catalyst Mass Loss in Sequence | | |
|---|---|---|
| Spent Cat (g) | Calcine (g) | Leach Residue (g) |
| 100 | 75.99 | 53.49 |

TABLE 6

| FB Spent Catalyst Mass Loss in Sequence | | |
|---|---|---|
| Spent Cat (g) | Calcine (g) | Leach Residue (g) |
| 100 | 74.20 | 50.17 |

TABLE 7

| Wt. Loss (%) | EB Spent Process Steps | Feed (g) | Mo (g) | Mo (%) | V (g) | V (%) | Ni (g) | Ni (%) | Fe (g) | Fe (%) | Al (g) | Al (%) |
|---|---|---|---|---|---|---|---|---|---|---|---|---|
| | EB Spent Theoretical Mass Balance per Unit Operation | | | | | | | | | | | |
| 0.00 | Spent | 100.0 | 3.05 | 3.05 | 12.31 | 12.31 | 3.89 | 3.89 | 0.50 | 0.50 | 21.50 | 21.50 |
| 24.61 | Calcine | 75.39 | 3.05 | 4.05 | 12.31 | 16.33 | 3.89 | 5.16 | 0.50 | 0.66 | 21.50 | 28.53 |
| 27.75 | KOH Leach Residue (65M) | 54.47 | 0.45 | 0.83 | 2.34 | 4.30 | 3.89 | 7.15 | 0.38 | 0.69 | 21.09 | 38.73 |
| Overall Metal Extraction (%): | | | | 85.17 | | 80.98 | | | | | | |

TABLE 8

| Wt. Loss (%) | FB Spent, Process Steps | Feed (g) | Mo (g) | Mo (%) | V (g) | V (%) | Ni (g) | Ni (%) | Fe (g) | Fe (%) | Al (g) | Al (%) |
|---|---|---|---|---|---|---|---|---|---|---|---|---|
| | FB Spent Theoretical Mass Balance per Unit Operation | | | | | | | | | | | |
| 0.00 | Spent | 100.0 | 3.09 | 3.09 | 13.81 | 13.81 | 4.30 | 4.30 | 0.69 | 0.69 | 21.66 | 21.66 |
| 24.88 | Calcine | 75.12 | 3.09 | 4.11 | 13.81 | 18.38 | 4.30 | 5.73 | 0.69 | 0.92 | 21.66 | 28.83 |
| 30.22 | KOH Leach Residue (65M) | 52.42 | 0.62 | 1.19 | 4.83 | 9.21 | 4.30 | 8.21 | 0.51 | 0.97 | 20.84 | 39.76 |
| Overall Metal Extraction (%): | | | | 79.84 | | 65.06 | | | | | | |

From the foregoing, it is noted for EB and FB metal extractions:

For Ebullated Bed (EB) spent catalyst without alkali, pyrometallurgical extractions of up to 85% Mo and up to 81% V coupled with hydrometallurgical recoveries of up to 99% Mo and up to 95% V; overall metal recoveries are projected at 84% Mo and 77% V; and For Fixed Bed (FB) spent catalyst without alkali, pyrometallurgical extractions of up to 80% Mo and up to 65% V coupled with hydrometallurgical recoveries of up to 99% Mo and up to 95% V; overall metal recoveries are projected at 79% Mo and 62% V.

Example 2A—Roasting Spent EB and FB Supported Catalyst with Potassium Carbonate and Hot Water Leaching of $K_2CO_3$/Spent Supported Catalyst Calcine The relatively low Mo and V extractions obtained from KOH leaching of as-is roasted spent catalyst without alkali was cause for concern in terms of commercial metal recovery and project economics. Potassium carbonate was stoichiometrically blended in with the roaster feed to define metal liberation mechanisms. The goal was to obviate unleachable species such as nickel vanadate and nickel molybdate and thereby increase metal extractions.

Reactions (2.1) through (2.9) below represent metal oxidation reactions with $K_2CO_3$; Gibb's free energies at 600° C. imply favorable oxidation per the sequence V>Mo>Fe>Ni>C>S; free energies at 600° C. for $CO_2$ and $SO_2$ imply that C will combust at a faster rate than S.

$$MoS_2 + 3K_2CO_3 + 9/2O_2 = K_2MoO_4 + 2K_2SO_4 + 3CO_2\uparrow \quad (2.1) \quad \Delta G_{873°K} = -1,571 \text{ kJ/g} \cdot \text{mol}$$
$$V_2S_3 + 4K_2CO_3 + 7O_2 = 2KVO_3 + 3K_2SO_4 + 4CO_2\uparrow \quad (2.2) \quad \Delta G_{873°K} = -2,600 \text{ kJ/g} \cdot \text{mol}$$
$$NiS + K_2CO_3 + 2O_2 = NiO + K_2SO_4 + CO_2\uparrow \quad (2.3) \quad \Delta G_{873°K} = -655 \text{ kJ/g} \cdot \text{mol}$$
$$2FeS + 2K_2CO_3 + 9/2O_2 = Fe_2O_3 + 2K_2SO_4 + 2CO_2\uparrow \quad (2.4) \quad \Delta G_{873°K} = -764 \text{ kJ/g} \cdot \text{mol}$$

-continued

| | | |
|---|---|---|
| $C + O_2 = CO_2\uparrow$ | (2.5) | $\Delta G_{873°K} = -396$ kJ/g · mol |
| $S + O_2 = SO_2\uparrow$ | (2.6) | $\Delta G_{873°K} = -298$ kJ/g · mol |
| $K_2CO_3 + SO_2 + 1/2O_2 = K_2SO_4 + CO_2\uparrow$ | (2.7) | $\Delta G_{873°K} = -280$ kJ/g · mol |
| $NiMoO_4 + K_2CO_3 = K_2MoO_4 + NiO + CO_2\uparrow$ | (2.8) | $\Delta G_{873°K} = -111$ kJ/g · mol |
| $Ni_3(VO_4)_2 + K_2CO_3 = 2KVO_3 + 3NiO + CO_2\uparrow$ | (2.9) | $\Delta G_{873°K} = -130$ kJ/g · mol |

Should any refractory and un-leachable $NiMoO_4$ form via interaction of intermediate $MoO_3$ and NiO species (reaction 1.10), the negative free energy indicates that the compound would be mostly altered to water soluble molybdate in the presence of alkali (reaction 2.8).

Without being bound by theoretical considerations, the negative Gibb's free energy of reaction (2.9) may suggest a degree of spontaneity of the forward reaction in the presence of potash. Based on reactions (1.7) through (1.9), un-leachable nickel vanadate formation also appears to be a certainty between 500° C. and 600° C.+ given the higher free energies as compared to reaction (2.2); this is further borne out by 2 hours of $SO_2$ evolution observed (FIGS. 6 and 7) following the first hour of hydrocarbon removal under Argon. The presence of $SO_2$, under an alkali roast, moreover, implies that reactions (1.7) through (1.9) were dominant. Reaction (2.9) indicates that all or most of the refractory nickel vanadate would be converted to the water leachable potassium vanadate moiety.

Controlled batch oxidation of up to 260 g deoiled spent catalyst, blended with varying stoichiometric additions of $K_2CO_3$ (Rocky Mountain Reagents, 28% passing 300-μm), sponded to conversion of metal sulfides to metal oxides in conjunction with alkali and coke to $CO_2$. Sulfur dioxide gas evolution was evident over 2 hours, after beginning air flow, indicating reactions (1.7) through (1.9) occurring or conversion of vanadium and nickel sulfides to refractory nickel vanadate in the presence of air. Subsequent conversion of nickel vanadate to the water leachable alkali vanadate is indicated per reaction (2.9).

These S oxidation and stoichiometric alkali fixations reactions, following hydrocarbon removal under Argon, are borne out by observation of the thermal oxidation product gas compositions during the roasting sequence (FIGS. 6 and 7) EB and FB spent catalyst.

Table 9 represents calcine assays at varying potash content for both types of spent catalyst; the high C and S levels are primarily due to residual $K_2CO_3$ and $K_2SO_4$ formation per reactions (1) through (4) and reactions (7) through (9). These residuals lower the Mo, Ni and V content on a mass basis in the calcine although the V/Ni molar ratios are within proximity to a similar ratio in Table 2.

TABLE 9

| Roaster $K_2CO_3$ Calcine Average Assays (wt. %) | | | | | | | | |
|---|---|---|---|---|---|---|---|---|
| Calcine type | $K_2CO_3$ | Mo | Ni | V | V/Ni Molar Ratio | Fe | Al | C | S |
| EB Calcine | Stoichiometric | 1.66 | 1.98 | 6.46 | 3.76 | 0.24 | 13.40 | 1.40 | 7.64 |
| | 15% > Stoich | 1.54 | 1.87 | 6.19 | 3.81 | 0.25 | 12.50 | 2.33 | 6.63 |
| | 25% > Stoich | 1.82 | 2.32 | 7.75 | 3.85 | 0.31 | 15.25 | 1.56 | 6.61 |
| FB Calcine | Stoichiometric | 1.42 | 1.94 | 6.95 | 4.13 | 0.41 | 11.40 | 1.86 | 6.99 |
| | 15% > Stoich | 1.24 | 1.72 | 6.28 | 4.21 | 0.34 | 9.98 | 2.61 | 6.46 |
| | 25% > Stoich | 1.30 | 1.77 | 6.33 | 4.12 | 0.36 | 10.20 | 2.47 | 6.36 | was conducted under 3 to 5 standard liter per minute air flow in a 4 in. diameter×14 in. operating length rotary quartz tube furnace; temperatures were held at between 600° C. and 625° C., simulating multiple hearth furnace conditions, with retention times of up to 8 hrs generated a calcine containing minimal petroleum coke and combustion of the S to soluble sulfate.

Both deoiled spent catalysts (EB and FB) were thoroughly blended with anhydrous $K_2CO_3$ at various stoichiometric Mo and V content levels in the spent material, i.e., a) stoichiometric, b) 15% above stoichiometric and c) 25% above stoichiometric.

The run began with a fast ramp-up to 500° C. under Argon gas flow to remove residual hydrocarbons in the spent catalyst. This was followed by a slow ramp to the operating bed temperature of 620° C. under 3 slpm air flow, an extended hold period with up to 4 slpm air with $CO_2$ and $SO_x$ emission measurements, followed by a slow cool down under excess air flow during reaction termination; the staged temperature control was a necessity to avoid significant heat release that would result in Mo loss and solids sintering.

A weight loss of up to 78% (Tables 12 and 13) was observed in EB and FB spent catalyst calcine that corre- Example 2B—Potassium Carbonate Calcine Hot Water Leaching The $K_2CO_3$ calcines were leached in hot water at 75° C. (pH 10.5-11.0) at 15 wt % solids for 3.0 hr without pH modification of the sample. The leach residues were vacuum filtered, washed, dried and submitted for analytics. The leach solutions were set aside for near term hydrometallurgical separation of V from Mo as represented in Examples 4A and 4B.

For both ground calcine $K_2CO_3$ roasted products, up to 78% dissolution (Tables 12 and 13) of the EB and FB calcine mass in hot water was observed with the remaining mass constituting insolubles in the washed leach residue.

EB Calcine: Mo and V extractions up to 91% respectively (Table 10) were achieved from hot water leaching of the potash calcine; a weight loss of up to 77% was apparent (Table 12). Leach residue metal assays are represented in Table 11 and identifies Al and Ni as constituting up to 40 wt % and 6.5 wt % respectively of the un-reacted solids phase.

XRD scans on the leach residue verified the insolubles as primarily $Al_2O_3$, NiO, some $Ni_3(VO_4)_2$, $Fe_2O_3$ and small amounts of α-NiMoO₄; C and S residuals, in the leach residue determined by Leco analyses, averaged <1-wt %.

The data also reveals that within experimental & assay discrepancies, stoichiometric amounts of potash are sufficient for optimal metal extractions.

FB Calcine: Mo and V extractions up to 91% and 88% respectively (Table 10) were achieved from hot water leaching of the potash calcine; a weight loss of up to 78% was apparent (Table 13). Leach residue metal assays are represented in Table 11 and identifies Al and Ni as constituting up to 40 wt % and 7.4-wt % respectively of the un-reacted solids phase.

XRD scans on the leach residue verified the insolubles as primarily Al₂O₃, NiO, some Ni₃(VO₄)₂, Fe₂O₃ and small amounts of α-NiMoO₄; C and S residuals, in the leach residue determined by Leco analyses, averaged <1-wt %.

Table 11 also supports the earlier statement that based on molar V/Ni ratio, the degree of V lock-up as refractory un-reacted nickel vanadate is greater with FB type K₂CO₃ roasted spent as compared to EB type K₂CO₃ roasted spent catalyst.

The data also indicates that within experimental and assay discrepancies, stoichiometric amounts of potash are sufficient for optimal metal extractions.

TABLE 13

FB Spent Catalyst Mass Loss Sequence

| $K_2CO_3$ | Spent Cat (g) | Calcine Wt Loss (wt. %) | Calcine (g) | Leach Residue Wt Loss (wt. %) | Leach Residue (g) |
|---|---|---|---|---|---|
| None | 100.0 | 24.9% | 75.1 | 30.2% | 52.4 |
| Stoichiometric* | | 6.9% | 93.1 | 74.0% | 24.2 |
| 15%> Stoichiometric* | | 6.8% | 93.2 | 75.5% | 22.9 |
| 25%> Stoichiometric* | | 6.3% | 93.7 | 76.3% | 22.2 |

*stoichiometry based on Mo and V levels

From the foregoing, it is noted for EB and FB metal extractions:

For Ebullated Bed (EB) spent catalyst, pyrometallurgical extractions of up to 90% Mo and up to 92% V coupled with hydrometallurgical recoveries of up to 99% Mo and up to 95% V; overall metal recoveries are projected at 89% Mo and 87% V; and For Fixed Bed (FB) spent catalyst, pyrometallurgical extractions of up to 91% Mo and up to 87% V coupled

TABLE 10

Potash Calcine Hot Water Leach (PH~10.5), Kinetic Period Extractions

| Calcine Type | $K_2CO_3$ | Mo (%) @ time (min) | | | V (%) @ time (min) | | |
|---|---|---|---|---|---|---|---|
| | | 60 | 120 | 180 | 60 | 120 | 180 |
| EB Calcine | None | 73.0 | 75.8 | 85.2 | 68.4 | 70.3 | 81.0 |
| (65M Tyler) | Stoichiometric | 85.2 | 86.6 | 90.1 | 84.7 | 86.8 | 92.5 |
| | 15% > Stoich | 89.5 | 81.7 | 86.4 | 80.9 | 82.7 | 91.4 |
| | 25% > Stoich | 81.5 | 87.4 | 91.6 | 74.3 | 79.1 | 87.8 |
| FB Calcine | None | 66.0 | 75.3 | 79.8 | 56.5 | 61.0 | 65.1 |
| (65M Tyler) | Stoichiometric | 86.6 | 85.7 | 91.1 | 80.6 | 85.0 | 87.2 |
| | 15% > Stoich | 85.4 | 87.4 | 90.6 | 80.8 | 83.1 | 88.2 |
| | 25% > Stoich | 80.1 | 85.8 | 89.3 | 77.7 | 85.5 | 86.5 |

TABLE 11

Calcine Hot Water Leach Residue (wt. %)

| Calcine type | $K_2CO_3$ | Mo | V | Ni | V/Ni Molar Ratio | Fe | Al | P | Ca | K | Na | C | S |
|---|---|---|---|---|---|---|---|---|---|---|---|---|---|
| EB | Stoichiometric | 0.65 | 1.84 | 6.49 | 0.33 | 0.43 | 39.60 | 0.03 | 0.15 | 1.75 | 0.28 | 0.20 | 0.20 |
| Calcine | 15% > Stoich | 0.85 | 2.09 | 6.30 | 0.38 | 0.43 | 39.40 | 0.08 | 0.15 | 1.86 | 0.40 | 0.60 | 0.93 |
| (65 Tyler) | 25% > Stoich | 0.58 | 2.41 | 6.18 | 0.45 | 0.42 | 37.70 | 0.08 | 0.14 | 2.05 | 0.05 | 0.10 | 0.06 |
| FB | Stoichiometric | 0.53 | 3.43 | 7.36 | 0.54 | 0.82 | 40.10 | 0.08 | 0.19 | 1.50 | 0.41 | 0.28 | 0.44 |
| Calcine | 15% > Stoich | 0.50 | 3.02 | 7.19 | 0.48 | 1.09 | 39.20 | 0.06 | 0.25 | 1.29 | 0.32 | 0.44 | 0.64 |
| (65 Tyler) | 25% > Stoich | 0.60 | 3.58 | 7.28 | 0.57 | 0.97 | 37.50 | 0.07 | 0.21 | 1.37 | 0.40 | 0.32 | 0.79 |

TABLE 12

EB Spent Catalyst Mass Loss in Sequence

| $K_2CO_3$ | Spent Cat (g) | Calcine Wt Loss (wt. %) | Calcine (g) | Leach Residue Wt Loss (wt. %) | Leach Residue (g) |
|---|---|---|---|---|---|
| None | 100.0 | 24.6% | 75.4 | 27.8% | 54.5 |
| Stoichiometric* | | 5.3% | 94.7 | 74.2% | 24.4 |
| 15%> Stoichiometric* | | 7.6% | 92.4 | 74.7% | 23.4 |
| 25%> Stoichiometric* | | 6.3% | 93.7 | 71.4% | 26.8 |

*stoichiometry based on Mo and V levels with hydrometallurgical recoveries of up to 99% Mo and up to 95% V; overall metal recoveries are projected at 90% Mo and 83% V.

Comparative Example 3A—Roasting EB and FB Spent Supported Catalyst with Sodium Carbonate and Hot Water Leaching of Na₂CO₃/Spent Supported Catalyst Calcine Soda ash or Na₂CO₃ is sometimes used commercially during roasting of spent catalyst where metals recovery is supported by a hydrometallurgical circuit to produce various Mo and V chemicals for catalyst and chemical manufacturing. Based on favorable thermodynamical evaluations on reaction spontaneity, sodium carbonate was stoichiometrically blended in with the roaster feed to define metal liberation mechanisms. The goal was to assess metal extractions alongside $K_2CO_3$ roasting.

Reactions (3.1) through (3.9) below represent the metal oxidation reactions with $Na_2CO_3$. Gibb's free energies at 600° C. suggest favorable oxidation per the sequence V>Mo>Fe>Ni>C>S. Free energies at 600° C. for $CO_2$ and $SO_2$ suggest that C will combust at a faster rate than S.

$$MoS_2 + 3Na_2CO_3 + 9/2O_2 = Na_2MoO_4 + 2Na_2SO_4 + 3CO_2 \uparrow \quad (3.1) \quad \Delta G_{873°K} = -1{,}504 \text{ kJ/g} \cdot \text{mol}$$
$$V_2S_3 + 4Na_2CO_3 + 7O_2 = 2\,NaVO_3 + 3Na_2SO_4 + 4CO_2 \uparrow \quad (3.2) \quad \Delta G_{873°K} = -2{,}506 \text{ kJ/g} \cdot \text{mol}$$
$$NiS + Na_2CO_3 + 2O_2 = NiO + Na_2SO_4 + CO_2 \uparrow \quad (3.3) \quad \Delta G_{873°K} = -630 \text{ kJ/g} \cdot \text{mol}$$
$$2FeS + 2Na_2CO_3 + 9/2O_2 = Fe2O_3 + 2Na_2SO_4 + 2CO_2 \uparrow \quad (3.4) \quad \Delta G_{873°K} = -739 \text{ kJ/g} \cdot \text{mol}$$
$$C + O_2 = CO_2 \uparrow \quad (3.5) \quad \Delta G_{873°K} = -396 \text{ kJ/g} \cdot \text{mol}$$
$$S + O_2 = SO_2 \uparrow \quad (3.6) \quad \Delta G_{873°K} = -298 \text{ kJ/g} \cdot \text{mol}$$
$$Na_2CO_3 + SO_2 + 1/2O_2 = Na_2SO_4 + CO_2 \uparrow \quad (3.7) \quad \Delta G_{873°K} = -255 \text{ kJ/g} \cdot \text{mol}$$
$$NiMoO_4 + Na_2CO_3 = Na_2MoO_4 + NiO + CO_2 \uparrow \quad (3.8) \quad \Delta G_{873°K} = -96 \text{ kJ/g} \cdot \text{mol}$$
$$Ni_3(VO_4)_2 + Na_2CO_3 = 2NaVO_3 + 3NiO + CO_2 \uparrow \quad (3.9) \quad \Delta G_{873°K} = -113 \text{ kJ/g} \cdot \text{mol}$$

Should any refractory and un-leachable $NiMoO_4$ form via interaction of intermediate $MoO_3$ and NiO species (reaction 1.10), the negative free energy in reaction (3.8) indicates that the compound would be mostly converted to water soluble molybdate in the presence of alkali.

The negative Gibb's free energy of reaction (3.9) implies a degree of spontaneity of the forward reaction in the presence of soda ash; based on reactions (1.7) through (1.9), un-leachable nickel vanadate formation appears to be a certainty between 500° C. and 600° C.+ given the higher free energies as compared to reaction (3.2); however, this was not manifested by $SO_2$ evolution during observation of the thermal oxidation product gas compositions (FIGS. 8 and 9), following the first hour of hydrocarbon removal under Argon. The minimal presence of $SO_2$, under a soda ash roast, may indicate that soda ash was more effective than potash in $SO_2$ capture and neutralization during gas transfer in the solids phase per reaction (3.7). Reaction (3.9) suggests that all or most of the refractory nickel vanadate would be converted to the water leachable potassium vanadate moiety.

Controlled batch oxidation of up to 260 g de-oiled spent catalyst, blended with varying stoichiometric additions of anhydrous $Na_2CO_3$ (Rocky Mountain Reagents, 28% passing 300-μm), was conducted under 3 to 5 standard liter per minute air flow in a 4 in. diameter×14 in. operating length rotary quartz tube furnace; temperatures were held at between 600° C. and 625° C., simulating multiple hearth furnace conditions, with retention times of up to 8 hrs generated a calcine containing minimal petroleum coke and combustion of the S to soluble sulfate.

Both de-oiled spent supported catalysts (EB and FB) were thoroughly blended with anhydrous $Na_2CO_3$ at various stoichiometric Mo and V content levels in the spent material, i.e., a) stoichiometric and b) 25% above stoichiometric.

The run began with a fast ramp-up to 500° C. under Argon gas flow to remove residual hydrocarbons in the spent catalyst. This was followed by a slow ramp to the operating bed temperature of 620° C. under 3 slpm air flow, an extended hold period with up to 4 slpm air with $CO_2$ and $SO_x$ emission measurements, followed by a slow cool down under excess air flow during reaction termination; the sequence was used to help avoid solids fusibility, sintering issues and significant heat release that would result in Mo loss.

A weight loss of up to 78% (Tables 17 and 18) was observed in EB and FB spent catalyst calcine that corresponded to conversion of metal sulfides to metal oxides in conjunction with alkali and coke to $CO_2$. Minimal $SO_x$ evolution was evident over the entirety of the run, after beginning air flow, indicating conversion of evolved $SO_2$ directly to sulfate in the presence of soda ash.

These S oxidation and stoichiometric alkali fixations reactions, following hydrocarbon removal under Argon, were borne out during observation of the thermal oxidation product gas compositions for the roasting sequence (FIGS. 8 and 9) for EB and FB spent catalyst.

Table 14 represents calcine assays at varying potash content for both types of spent supported catalyst. The high C and S levels are primarily due to residual $K_2CO_3$ and $K_2SO_4$ formation per reactions (3.1) through (3.4) and reaction (3.7). These residuals lower the Mo, Ni, and V content on a mass basis in the calcine although the V/Ni molar ratios are within proximity to a similar ratio in Table 2.

TABLE 14

| Roaster $K_2CO_3$ Calcine Average Assays (wt. %) | | | | | | | | |
|---|---|---|---|---|---|---|---|---|
| Calcine typex | $K_2CO_3$ | Mo | Ni | V | V/Ni Molar Ratio | Fe | Al | C | S |
| EB Calcine | Stoichiometric | 1.81 | 2.03 | 6.44 | 3.66 | 0.24 | 9.83 | 2.24 | 7.67 |
| | 25% > Stoich | 1.34 | 1.59 | 5.20 | 3.77 | 0.21 | 8.35 | 4.10 | 6.38 |
| FB Calcine | Stoichiometric | 1.60 | 2.09 | 7.36 | 4.06 | 0.40 | 7.77 | 1.99 | 8.82 |
| | 25% > Stoich | 1.46 | 1.85 | 6.38 | 3.97 | 0.35 | 7.81 | 3.02 | 7.71 |

Example 3B—Sodium Carbonate Calcine Hot Water Leaching

The $Na_2CO_3$ calcines were leached in hot water at 75° C. (pH 10.5-11.0) at 15 wt. % solids for 3.0 hr without pH modification of the sample. The leach residues were vacuum filtered, washed, dried and submitted for analytics. The leach solutions were set aside for near term hydrometallurgical separation of V from Mo as exemplified in Examples 4A and 4B.

For both ground calcine $Na_2CO_3$ roasted products, up to 78% dissolution (Tables 17 and 18) of the EB and FB calcine mass in hot water was observed with the remaining mass constituting insolubles in the washed leach residue.

EB Calcine: Mo and V extractions up to 88% respectively (Table 15) were achieved from hot water leaching of the soda ash calcine; a weight loss of up to 78% was apparent (Table 17). Leach residue metal assays are represented in Table 16 and identifies Al and Ni as constituting up to 38 wt. % and 7 wt. % respectively of the un-reacted solids phase.

XRD scans on the leach residue verified the insolubles as primarily $Al_2O_3$, $Ni_3(VO_4)_2$, $Fe_2O_3$ and small amounts of $\alpha$-$NiMoO_4$; NiO residue, a product of reactions (3.3) and (3.9), was not detected. C and S residuals in the leach residue, determined by Leco analyses, averaged <0.2 wt %.

The data also reveals that within experimental and assay discrepancies, stoichiometric amounts of soda ash are sufficient for optimal metal extractions.

FB Calcine: Mo and V extractions up to 90% and 78% respectively (Table 15) were achieved from hot water leaching of the soda ash calcine; a weight loss of up to 75% was apparent (Table 18). Leach residue metal assays are represented in Table 16 and identifies Al and Ni as constituting up to 35 wt. % and 7.2 wt. % respectively of the unreacted solids phase.

XRD scans on the leach residue verified the insolubles as primarily $Al_2O_3$, $Ni_3(VO_4)_2$, $Fe_2O_3$ and small amounts of $\alpha$-$NiMoO_4$; NiO residue, a product of reactions (3.3) and (3.9), was again not detected. C and S residuals in the leach residue, determined by Leco analyses, averaged <0.2 wt. %.

V extraction in hot water, following a soda ash roast of FB spent catalyst, reveals significantly lower yields as compared to its EB spent catalyst. A comparison of V/Ni molar ratios between Tables 11 and 16 (hot water leach residues) exposes significant lock-up of V in Ni suggesting that the soda ash roast was incapable of liberating the metal from refractory nickel vanadate. This is especially true of the FB calcine.

The data also indicates that within experimental and assay discrepancies, stoichiometric amounts of soda ash are sufficient for optimal metal extractions.

TABLE 15

Soda Ash Calcine Hot Water Leach (PH~10.5), Kinetic Period Extractions

| Calcine type | $Na_2CO_3$ | Mo (%) @ time (min) | | | V (%) @ time (min) | | |
|---|---|---|---|---|---|---|---|
| | | 60 | 120 | 180 | 60 | 120 | 180 |
| EB Calcine | None | 73.0% | 75.8% | 85.2% | 68.4% | 70.3% | 81.0% |
| (65M Tyler) | Stoichiometric | 83.6% | 85.5% | 88.7% | 82.6% | 85.5% | 88.4% |
| | 25% > Stoichiometric | 84.3% | 86.9% | 88.0% | 82.6% | 83.4% | 86.7% |
| FB Calcine | None | 66.0% | 75.3% | 79.8% | 56.5% | 61.0% | 65.1% |
| (65M Tyler) | Stoichiometric | 85.1% | 85.6% | 90.4% | 72.1% | 72.3% | 77.7% |
| | 25% > Stoichiometric | 82.5% | 84.4% | 88.9% | 69.0% | 70.2% | 74.2% |

TABLE 16

Soda Ash Calcine Hot Water Leach Residue (wt. %)

| Calcine type | $Na_2CO_3$ | Mo | V | Ni | V/Ni Molar Ratio | Fe | Al | P | Ca | K | Na | C | S |
|---|---|---|---|---|---|---|---|---|---|---|---|---|---|
| EB Calcine | Stoichiometric | 0.63 | 2.34 | 6.56 | 0.41 | 0.42 | 35.50 | 0.03 | 0.13 | 0.01 | 0.75 | 0.09 | 0.04 |
| | 25% > Stoich | 0.70 | 3.01 | 6.92 | 0.50 | 0.48 | 37.80 | <0.001 | 0.15 | 0.01 | 0.71 | 0.10 | 0.03 |
| FB Calcine | Stoichiometric | 0.50 | 5.33 | 7.20 | 0.85 | 0.94 | 35.40 | 0.04 | 0.20 | 0.01 | 0.82 | 0.17 | 0.04 |
| | 25% > Stoich | 0.58 | 5.90 | 7.05 | 0.96 | 0.94 | 33.70 | <0.001 | 0.18 | 0.00 | 0.78 | 0.16 | 0.04 |

TABLE 17

EB Spent Catalyst Mass Loss in Sequence

| $Na_2CO_3$ | Spent Cat (g) | Calcine Wt Loss (wt. %) | Calcine (g) | Leach Residue Wt Loss (wt. %) | Leach Residue (g) |
|---|---|---|---|---|---|
| None | 100.0 | 24.6 | 75.4 | 27.8 | 54.5 |
| Stoichiometric* | | 7.4 | 92.6 | 68.2 | 29.4 |
| 25%> Stoichiometric* | | 5.6 | 94.4 | 76.7 | 22.0 |

*stoichiometry based on Mo and V levels

TABLE 18

FB Spent Catalyst Mass Loss in Sequence

| Na$_2$CO$_3$ | Spent Cat (g) | Calcine Wt Loss (wt. %) | Calcine (g) | Leach Residue Wt Loss (wt. %) | Leach Residue (g) |
|---|---|---|---|---|---|
| None | 100.0 | 24.6 | 75.4 | 27.8 | 54.5 |
| Stoichiometric* | | 7.7 | 92.3 | 69.8 | 27.9 |
| 25%> Stoichiometric* | | 6.9 | 93.1 | 72.7 | 25.4 |

*stoichiometry based on Mo and V levels

Metals extraction and overall metals recovery results (FIG. 4 to FIG. 9) as described in the examples are summarized in Table 19.

TABLE 19

Metals Extraction and Overall Metals Recovery (FIGS. 4-9)

| FIG. | Feed In | Calcine wt. loss (%) | Metals Extraction (%) Mo | V | Overall Metals Recovery (%) Mo | V |
|---|---|---|---|---|---|---|
| 4 | EB Spent Cat | 24.0 | 85.2 | 81.0 | 84.3 | 77.0 |
| 5 | FB Spent Cat | 25.8 | 79.8 | 65.1 | 79.0 | 61.8 |
| 6 | EB Spent Cat + Stoichiometric K$_2$CO$_3$ | 5.3 | 90.1 | 92.5 | 89.2 | 87.9 |
| 7 | FB Spent Cat + Stoichiometric K$_2$CO$_3$ | 6.9 | 91.1 | 87.2 | 90.2 | 82.8% |
| 8 | EB Spent Cat + Stoichiometric Na$_2$CO$_3$ | 7.4 | 88.7 | 88.4 | 87.8 | 84.0 |
| 9 | FB Spent Cat + Stoichiometric Na$_2$CO$_3$ | 7.7 | 90.4 | 77.7 | 89.5 | 73.8 |

TABLE 20

Metals Overall Recovery Summary

| Operation | Ebulliated Bed Mo | V | Fixed Bed Mo | V |
|---|---|---|---|---|
| Roast w/o Alkali-Ex 1A | 85% | 81% | 80% | 65% |
| Roast with K$_2$CO$_3$-Ex 2A | 90% | 92% | 91% | 87% |
| Roast with Na$_2$CO$_3$-Ex 3A | 89% | 88% | 90% | 78% |
| Leaching, Metals Separation & Recovery, Examples 4A/4B | 99% | 95% | 99% | 95% |
| Overall Metals Recovery-Ex 1B | 84% | 77% | 79% | 62% |
| Overall Metals Recovery-Ex 2B | 89% | 87% | 90% | 83% |
| Overall Metals Recovery-Ex 3B | 88% | 84% | 89% | 74% |

From the foregoing, it is noted for EB and FB metal extractions:

For Ebullated Bed (EB) spent catalyst, pyrometallurgical extractions of up to 89% Mo and up to 88% V coupled with hydrometallurgical recoveries of up to 99% Mo and up to 95% V. Overall metal recoveries are projected at 88% Mo and 84% V; and For Fixed Bed (FB) spent catalyst, pyrometallurgical extractions of up to 90% Mo and up to 78% V coupled with hydrometallurgical recoveries of up to 99% Mo and up to 95% V. Overall metal recoveries are projected at 89% Mo and 74% V.

General Conclusions for the Roasting Scenarios:

Overall metal recoveries from the two types of spent supported catalyst, under various roasting scenarios, are shown in Table 20.

The following is noteworthy for Examples 1, 2 and 3:

a) Mo and V recoveries are up to 5% and up to 10% greater respectively for EB roasted with both alkalis than without;

b) Mo and V recoveries are up to 10% and up to 20% greater respectively for FB roasted with both alkalis than without;

c) Mo recoveries from both EB and FB types using either alkali were similar;

d) V recovery delta from EB spent catalyst using a potash roast was up to 3% superior than a soda ash roast; and e) V recovery delta from FB spent using a potash roast was up to 9% greater than a soda ash roast.

Example 4A—Ammonium Metavanadate Crystallization from Leach Solution

Stirred solutions of the leach filtrate (pH 10.0 and above) from Examples 1B, 2B and 3B were heated to 60° C. Sufficient 70% concentrated HNO$_3$ acid was added to lower pH ~8.8.

100-gpL NH$_4$NO$_3$ crystals were added and pH was adjusted to ~7.5 with HNO$_3$ or NH$_4$OH.

If solution vanadium concentration was <10-gpL, an AMV seed/spike of 10 gpL was added in powder form to the hot stirred solution.

The metathesis reaction was continued for 1.5 hour at 60° C. with pH maintained between 7.0 and 8.0.

The following double displacements constitute the metathesis or ion exchange between NH$_4^+$ and K$^+$ or Na$^+$ and is depicted in reactions 4.1 and 4.2:

$$NH_4NO_3 + KVO_3 = NH_4VO_{3\downarrow} + KNO_3 \qquad (4.1)$$

$$2NH_4NO_3 + K_2MoO_4 = (NH_4)_2MoO_4 + 2KNO_3 \qquad (4.2)$$

The solution was subsequently transferred to a vacuum cooling crystallizer at 10° C. under 21 inch Hg for 3 hrs with crystallization continuing under gentle rotation;

The AMV crystals were vacuum filtered with the filtrate set aside for Mo precipitation; the crystals were washed with three pore volumes of pure 4,800 mg/L AMV solution chilled to 10° C.; the wash solution may be reused until the residual Mo concentration augments up to 25,000 ppmw, after which it may be recycled to the metathesis circuit.

The yellowish AMV crystals were dried at 60° C.-70° C. Table 21 displays that continuous cooling crystallization at 10° C. provided lower V content in the barren solution.

Estimated AMV purity includes up to 97 wt. % NH$_4$VO$_3$, with the balance as Mo and K or Na species together with NO$_3^-$ anions.

The barren solution or Mo filtrate was transferred to the acid precipitation circuit for Mo recovery.

TABLE 21

| | | | | | | AMV Solids | | Barren Solution | | AMV |
| | | AMV Crystallization | | | | (wt. %) | | (wt. %) | | Recovery |
| Sample ID | Solution Chemistry | Heating (° C.) | Time (min) | Cooling (° C.) | Time (min) | Mo | V | Mo | V | (%) |
|---|---|---|---|---|---|---|---|---|---|---|
| A | Nitrate | 30 | 60 | 10 | 90 | 0.877 | 41.7 | 6.93 | 0.060 | 91 |
| B | Nitrate | Cooling at 10° C. only | | 10 | 180 | 0.388 | 42.0 | 6.89 | 0.033 | 95 |

Example 4B—Molybdenum Trioxide Precipitation from AMV Barren Solution

The stirred barren solution from the V crystallization circuit was heated to 65° C. followed by careful addition of 70% concentrated HNO$_3$ acid to pH ~1.0. The pH and temperature were maintained with adequate stirring for up to 4 hours. The precipitation effect is shown in reaction 4.3.

$$(NH_4)_2MoO_4 + 2HNO_3 = MoO_3 \cdot H_2O \downarrow + 2NH_4NO_3 \quad (4.3)$$

Table 22 depicts up to 99% Mo recovery within 2 hours at the lower pH and temperature and higher HNO$_3$ acid dosage.

The slurry was cooled to near ambient at reaction termination and filtered. The barren filtrate containing <1,000 mg/L Mo, <100 mg/L V, up to 40,000 mg/L of K$^+$ or Na$^+$ ion and up to 15,000 mg/L NH$_4^+$ ion was transferred to iron precipitation for residual metals removal. The transition metals depleted solution was subsequently subjected to cooling crystallization under vacuum to produce a mixture of KNO$_3$ and NH$_4$NO$_3$.

The cake was washed with 2 pore volumes (PV) pH 1 ambient AHM* with the wash filtrate recycled. The cake solids were subsequently re-slurried at 25 wt. % solids in pH 1 AHM at ambient w/stirring for 15-min.

The slurry was re-filtered and the exiting barren filtrate was directed to wash recycle. The filter cake was washed with 4 PV pH 1 ambient AHM; the barren filtrate was recycled as wash. Solids were dried at 70° C. to 100° C.

Estimated MoO$_3$ purity includes up to 95 wt. % MoO$_3 \cdot$H$_2$O, up to 0.75 wt. % total K or Na and V and the remaining NH$_4^+$ and NO$_3^-$ ions.

The described sequence of wash steps was used to lower K$^+$ or Na$^+$ ion levels to <0.5 wt. % in the MoO$_3$ product. The alkali metal(s) acts as a poison during catalyst synthesis so reduced values are desired. K$^+$ or Na$^+$ ion levels in the MoO$_3$ slurry may run up to 20% with an immobile and unremovable fraction of the K$^+$ or Na$^+$ ion substituting hydronium ions in the layered MoO$_3$ structure. Note: *pH 1 AHM was prepared by acidulating pure 200 gpL Ammonium Heptamolybdate (AHM) solution to pH 1 at 65° C. with conc. HNO$_3$ acid and reacting for 2.5 hrs. Following liquid-solid separation, the MoO$_3$ solids may be recovered as final product and the filtrate used as wash solution for the commercial MoO$_3$ cake.

TABLE 22

Molybdenum Precipitation from AMV Barren Solution

| SAMPLE ID | Time (min) | Wt. % Solids | % Mo recovered | % V recovered |
|---|---|---|---|---|
| A1: | 60 | 12.2 | 92.8 | 62.9 |
| 65° C., pH: 1, | 120 | 12.4 | 99.0 | 79.7 |
| conc HNO$_3$ added: 90 kg/mt solution | 240 | 13.3 | 99.1 | 84.3 |
| A2: | 60 | 12.5 | 91.3 | 44.2 |
| 75° C., pH~1, | 120 | 14.2 | 98.6 | 83.1 |
| conc HNO$_3$ added: 90 kg/mt solution | 180 | 13.3 | 99.1 | 86.0 |
| A3: | 60 | 16.6 | 93.8 | 20.7 |
| 75° C., pH~1.6, | 120 | 17.7 | 98.8 | 25.5 |
| conc HNO$_3$ added: 70 kg/mt solution | 240 | 19.7 | 99.1 | 28.8 |

APPENDIX A—PUBLICATIONS

List of patents or literature references that may relate to the disclosure:

1. Marcantonio, P. J., "Process for Metals Recovery from Spent Catalyst", U.S. Pat. No. 7,485,267, issued Feb. 2009;
2. Bhaduri, R. S., "Process for recovering base metals from spent hydroprocessing catalyst", U.S. Pat. No. 7,658,895, issued Feb. 9, 2010;
3. Marcantonio, P. M., "Process for Metals Recovery from Spent Catalyst", U.S. Pat. No. 7,736,607, Issued Jun. 15, 2010;
4. Bhaduri, R. S., "Process for recovering base metals from spent hydroprocessing catalyst", U.S. Pat. No. 7,837,960, issued Nov. 23, 2010;
5. Bhaduri, R. S., "Process for recovering base metals from spent hydroprocessing catalyst", U.S. Pat. No. 7,846,404, issued Dec. 7, 2010;
6. Bhaduri, R. S., "Systems and Methods for Producing a Crude Product", U.S. Pat. No. 8,236,169, issued Aug. 7, 2012;
7. Bhaduri, R. S., Process for Recovering Metals from Coal Liquefaction Residue containing Spent Catalysts", U.S. Pat. No. 8,628,735, issued Jan. 14, 2014;
8. Bhaduri, R. S., "Hydroprocessing Catalysts and Methods for Making Thereof", U.S. Pat. No. 8,778,828, issued Jul. 15, 2014;

9. Bhaduri, R. S., "Recovery of Vanadium from Petroleum Coke slurry containing solubilized Base Metals", U.S. Pat. No. 8,815,185, issued Aug. 26, 2014;

10. Bhaduri, R. S., "Process for Separating and Recovering Metals", U.S. Pat. No. 8,815,184, issued Aug. 26, 2014;

11. Bhaduri, R. S., "Process for Separating and Recovering Metals", U.S. Pat. No. 9,809,870, issued Nov. 7, 2017;

12. Marafi, M., Stanislaus, and A., "Options and Processes for Spent Catalyst Handling and Utilization", Journal of Hazardous Materials, B101 (2003), pp. 123-132;

13. Llanos, Z. R., and Deering, W. G., "Processes for the Recovery of Metals from Spent Hydroprocessing Catalysts", Third International Symposium on Recycling of Metals and Engineered Materials, Edited by P. B. Queneau and R. D. Peterson, TMMS, 1995, pp 425;

14. Llanos, Z. R., Lacave, J., and Deering, W. G., "Treatment of Spent Hydroprocessing Catalysts at Gulf Chemical and Metallurgical Corporation", SME Annual Meeting, March 1986, New Orleans, Louisiana;

15. Marafi M., Rana, M. S., and Al-Sheeha H., "The Recovery of Valuable Metals and Recycling of Alumina from a Waste Spent Hydroprocessing Catalyst: Extraction with Na Salts", 2014, WIT Transactions on Ecology and The Environment, Vol 180, pp 15-27;

16. B. B. Kar, P. Datta, and V. N. Misra, "Spent catalyst: secondary source for molybdenum recovery", Hydrometallurgy, 72 (2004) 87-92, 26 May 2003;

17. Furimsky E., and Massoth F. E., "Deactivation of hydroprocessing catalysts", Catalysis Today, 1999; 52, pp. 381-495;

18. C. Bartholomew, J. Birtill, and A. Hassan, "Catalyst Deactivation, Regeneration and Disposal", The Catalyst Group Resources, Spring House, PA;

19. "Qualitative Inorganic Analysis", Vogel, A. I., 4th Edition, 1953;

20. "Analytical Chemistry", Treadwell, F. P., 5th Edition, 1919;

21. Ullmann's Encyclopedia of Industrial Chemistry, Fifth Edition, Editors: Elvers, B., Hawkins, S., Schulz, G., Volume A16;

22. A. Roine, HSC Chemistry® [Software], Outotec, Pori 2018. Software available at www.outotec.com/HSC;

23. M. Morishita and A. Navrotsky, "Calorimetric Study of Nickel Molybdate: Heat Capacity, Enthalpy and Gibbs Energy of Formation", J. Am. Ceramic Society, 86 [11], pp 1927-32, 2003.

Additional details concerning the scope of the invention and disclosure may be determined from the appended claims.

The foregoing description of one or more embodiments of the invention is primarily for illustrative purposes, it being recognized that variations might be used which would still incorporate the essence of the invention. Reference should be made to the following claims in determining the scope of the invention.

For the purposes of U.S. patent practice, and in other patent offices where permitted, all patents and publications cited in the foregoing description of the invention are incorporated herein by reference to the extent that any information contained therein is consistent with and/or supplements the foregoing disclosure.

What is claimed is:

1. A method for recovering metals from a deoiled spent supported catalyst, wherein the catalyst comprises a Group VIB metal, a Group VIIIB metal, a Group VB metal and a catalyst support material, the method comprising:

combining a deoiled spent supported catalyst comprising Group VIIIB, Group VIB, and Group VB metals with potassium carbonate to form a deoiled spent catalyst/potassium carbonate mixture;

heating the deoiled spent supported catalyst/potassium carbonate mixture under oxidative conditions to reduce the levels of sulfur and carbon and to form a spent supported catalyst/potassium carbonate calcine comprising a water-soluble Group VIB metal compound, a water-soluble Group VB metal compound and a water-insoluble Group VIIIB metal compound;

combining the spent supported catalyst/potassium carbonate calcine with water under slurry leach process conditions to form a spent supported catalyst/potassium carbonate calcine slurry and to leach the water-soluble Group VIB metal compound and the water-soluble Group VB metal compound from the spent supported catalyst/potassium carbonate calcine;

separating and removing a filtrate and a solid residue from the spent supported catalyst/potassium carbonate calcine slurry, the filtrate comprising the water-soluble Group VIB metal compound and the water-soluble Group VB metal compound and the solid residue comprising the water-insoluble Group VIIIB metal compound; and recovering the water-soluble Group VIB metal compound and the water-soluble Group VB metal compound from the filtrate of the spent supported catalyst/potassium carbonate calcine slurry.

2. The method of claim 1, wherein the deoiled spent supported catalyst is substantially devoid of residual hydrocarbons, or is devoid of residual hydrocarbons, or comprises residual hydrocarbons in an amount of less than about 1000 ppm.

3. The method of claim 1, wherein the deoiled spent supported catalyst comprises residual hydrocarbons and the process further comprises heating the catalyst under optionally non-oxidative conditions sufficient to reduce the level of residual hydrocarbons via pyrolysis to an amount of less than about 1000 ppm.

4. The method of claim 1, wherein the oxidative conditions comprise a temperature in the range of about 575° C. to 600° C., or 600-625° C., or 625-650° C.

5. The method of claim 1, wherein the catalyst support material comprises alumina, silica, titania, or a combination thereof, or wherein a catalyst support material comprising alumina, silica, titania, or a combination thereof is used to prepare the catalyst.

6. The method of claim 1, wherein the spent supported catalyst does not comprise or is not a slurry catalyst.

7. The method of claim 1, wherein the spent supported catalyst is an ebullated bed or a fixed bed catalyst.

8. The method of claim 1, wherein the oxidative heating conditions comprise heating the deoiled spent supported catalyst at a first temperature in the presence of air, or a gas mixture comprising no more than about 20 vol. % oxygen.

9. The method of claim 1, wherein the levels of sulfur and carbon are individually, or both reduced to less than preselected amounts, as measured by $CO_2$ and $SO_2$ thermal oxidation product gas analysis, of less than about 1 wt. %.

10. The method of claim 1, wherein the heating of the spent supported deoiled catalyst/potassium carbonate mixture under oxidative conditions is at a temperature in the range of about 600° C. to 650° C.

11. The method of claim 10, wherein the heating under oxidative conditions comprises heating for a pre-selected time in the range of about 0.5 to 12 hr.

12. The method of claim 10, wherein the heating comprises first heating under inert gas heating conditions at a temperature of less than about 600° C. for a pre-selected time in the range of about 0.5 to 4 hr.

13. The method of claim 10, wherein the heating under oxidative conditions produces gasses and is conducted so that the thermal oxidation product gas comprises at least about 20 wt. % $O_2$, less than about 0.25 wt. % $CO_2$ and less than about 0.25 wt. % $SO_2$.

14. The method of claim 1, wherein the gas flow conditions during heating of the deoiled spent supported catalyst/potassium carbonate mixture under oxidative conditions comprise air and are sufficient to remove any thermal oxidation product gas.

15. The method of claim 1, wherein the slurry leach process conditions comprise a leach temperature in the range of about 60 to 90° C.

16. The method of claim 1, wherein the slurry leach process conditions comprise a leach time in the range of about 1 to 5 hr.

17. The method of claim 1, wherein the slurry leach process conditions comprise a leach pH in the range of about 9.5 to 11.

18. The method of claim 1, wherein the slurry leach of the potassium carbonate calcine is conducted without pH modification.

19. The method of claim 1, wherein the filtrate comprises soluble molybdate or vanadate compounds, or a mixture thereof.

20. The method of claim 1, wherein the filtrate contains greater than about 70 wt. % of the Group VIB metal or greater than about 50 wt. % of the Group VB metal present in the deoiled spent supported catalyst.

21. The method of claim 1, wherein the solid residue comprises Group VB metal and/or Group VIB metal and/or Group VIIIB metal compound solids.

22. The method of claim 1, wherein the filtrate comprises potassium molybdate, potassium vanadate, or a mixture thereof.

23. The method of claim 1, wherein the extraction of the Group VB metal present in the deoiled spent supported catalyst is greater than about 80 wt. %.

24. The method of claim 1, wherein the extraction of the Group VIB metal present in the deoiled spent supported catalyst is greater than about 80 wt. %.

25. The method of claim 1, wherein the recovery of the water-soluble Group VIB metal compound and the water-soluble Group VB metal compound from the potassium carbonate calcine slurry filtrate is carried out by separately recovering the Group VIB and the Group VB metal compounds from the filtrate, the method comprising:

contacting the filtrate comprising the Group VIB and Group VB metal compounds with an ammonium salt to form a mixture under metathesis reaction conditions effective to convert the metal compounds to ammonium Group VB metal and ammonium Group VIB metal compounds;

subjecting the mixture comprising the ammonium Group VB metal compound to conditions effective to crystallize the ammonium Group VB metal compound;

filtering and washing the crystallized ammonium Group VB metal compound with a saturated ammonium Group VB metal compound wash solution at a pre-selected wash temperature and separately recovering the ammonium Group VB metal compound and an ammonium Group VIB metal compound filtrate;

heating the ammonium Group VB metal compound under conditions effective to release ammonia and separately recovering the Group VB metal compound and ammonia;

contacting the ammonium Group VIB metal compound filtrate with an inorganic acid under conditions effective to form a Group VIB metal oxide compound precipitate and an ammonium salt of the inorganic acid;

filtering and washing the Group VIB metal oxide compound precipitate with an ammonium Group VIB metal oxide compound wash solution at a pre-selected wash temperature and recovering the Group VIB metal oxide compound precipitate.

26. The method of claim 25, wherein Group VB metal comprises vanadium and/or the Group VIB metal comprises molybdenum.

27. The method of claim 25, wherein the aqueous mixture comprising Group VIB and Group VB metal compounds comprises a potassium salt of the Group VIB compound and a potassium salt of the Group VB metal compound.

28. The method of claim 25, wherein the ammonium salt contacted with the filtrate comprising the Group VIB and Group VB metal compounds comprises ammonium nitrate.

29. The method of claim 25, wherein the metathesis reaction conditions comprise a pH in the range of less than about 9; a temperature in the range of less than about 80° C.; and/or a reaction time in the range of about 0.25 to 2 hr.

30. The method of claim 25, wherein the metathesis reaction conditions comprise the conversion of potassium vanadate to the corresponding ammonium metavanadate compound and potassium salt.

31. The method of claim 25, wherein the metathesis reaction conditions comprise the sequential steps of adjusting the pH of the aqueous mixture to a range of about 8 to about 9, adding the ammonium salt to the aqueous mixture, and adding ammonium Group VB metal compound seed at a pH in the range of about 7.5 to 8.5 to the aqueous mixture.

32. The method of claim 25, wherein the ammonium Group VB metal compound crystallization conditions comprise a temperature in the range of greater than 0° C. to about 15° C., vacuum conditions, and a crystallization time period of about 1 hr to about 6 hr.

33. The method of claim 25, wherein the filtering and washing of the crystallized ammonium Group VB metal compound conditions comprise a wash temperature in the range of greater than 0° C. to about 15° C., optionally, wherein the crystallized ammonium Group VB metal compound and the wash solution comprise ammonium metavanadate and, optionally, wherein the wash solution is recycled for crystallization of the ammonium Group VB metal compound.

34. The method of claim 25, wherein the conditions for heating of the ammonium Group VB metal compound comprise heating the ammonium Group VB metal compound at a temperature in the range of about 200-450° C. for a time sufficient to release ammonia in an amount of at least about 90% of the amount present in the ammonium Group VB metal compound.

35. The method of claim 25, wherein the conditions for contacting of the ammonium Group VIB metal compound filtrate with an inorganic acid comprise introducing the inorganic acid at a temperature in the range of about 50 to 80° C. to provide a pH of about 1-3, for a reaction time period of about 1 hr to about 4 hr.

36. The method of claim 25, wherein the conditions for filtering and washing of the Group VIB metal oxide compound precipitate with an ammonium Group VIB metal oxide compound wash solution comprise a wash temperature in the range of greater than 0° C. to about 25° C., optionally, wherein the wash solution comprises ammonium heptamolybdate depleted of Mo at pH 1 and, optionally, wherein the wash solution is recycled for filtering and washing of the Group VIB metal oxide compound.

37. The method of claim 25, wherein the recovery of the Group VB metal present in the filtrate comprising the Group VIB and Group VB metal compounds is greater than about 85 wt. %.

38. The method of claim 25, wherein the recovery of the Group VIB metal present in the filtrate comprising the Group VIB and Group VB metal compounds is greater than about 85%.

39. The method of claim 25, wherein the saturated ammonium Group VB metal compound wash solution comprises the same ammonium Group VB metal compound as the crystallized ammonium Group VB metal compound, or wherein the saturated ammonium Group VB metal compound of the wash solution is the same ammonium Group VB metal compound as the crystallized ammonium Group VB metal compound.

40. The method of claim 25, wherein the ammonium Group VIB metal oxide compound wash solution comprises the same ammonium Group VIB metal oxide compound as the precipitated ammonium Group VIB metal oxide compound, or wherein the ammonium Group VIB metal oxide compound of the wash solution is the same ammonium Group VIB metal oxide compound as the precipitated ammonium Group VIB metal compound.

* * * * *